United States Patent [19]

Forney, Jr. et al.

[11] Patent Number: 5,040,191

[45] Date of Patent: Aug. 13, 1991

[54] PARTIAL RESPONSE CHANNEL SIGNALING SYSTEMS

[75] Inventors: G. D. Forney, Jr., Cambridge; Vedat M. Eyuboglu, Boston, both of Mass.

[73] Assignee: Codex Corporation, Mansfield, Mass.

[21] Appl. No.: 550,217

[22] Filed: Jul. 10, 1990

Related U.S. Application Data

[63] Continuation of Ser. No. 208,867, Jun. 15, 1988, abandoned, which is a continuation of Ser. No. 18,345, Feb. 24, 1987, abandoned.

[51] Int. Cl.$^5$ ............................................. H04L 27/34
[52] U.S. Cl. ...................................... 375/39; 332/103; 371/43; 375/18
[58] Field of Search ................. 375/18, 25, 37, 39, 375/42, 54, 34, 58, 101, 59, 94; 370/30, 37; 371/43, 44, 45, 46, 55, 56; 364/514, 554, 734, 812; 332/103, 104, 106, 108, 115

[56] References Cited

U.S. PATENT DOCUMENTS

| | | | |
|---|---|---|---|
| 3,887,021 | 6/1975 | Forney et al. | 375/39 |
| 4,077,021 | 2/1978 | Cjsaka et al. | 332/9 R |
| 4,439,863 | 3/1984 | Bellamy | 375/18 |
| 4,553,237 | 11/1985 | Nakamura | 371/37 |
| 4,581,601 | 4/1986 | Calderbank | 340/347 |
| 4,597,090 | 6/1986 | Forney | 375/39 |
| 4,601,044 | 7/1986 | Kromer et al. | 371/43 |
| 4,620,311 | 10/1986 | Immink | 375/19 |
| 4,630,288 | 12/1986 | Longstaff et al. | 375/39 |
| 4,631,735 | 12/1986 | Qureshi | 375/34 |
| 4,646,305 | 2/1987 | Tretter et al. | 375/39 |
| 4,698,809 | 10/1987 | Munter | 371/30 |
| 4,700,349 | 10/1987 | Gallagher | 371/30 |
| 4,713,817 | 12/1987 | Wei | 371/43 |
| 4,720,839 | 1/1988 | Feher et al. | 375/18 |
| 4,788,694 | 11/1988 | Calderbank | 375/18 |

OTHER PUBLICATIONS

Ungerboeck, "Channel Coding with Multilevel/Phase Signals", IEEE Trans, vol. IT-28, No. 1, Jan. 1982, pp. 55-67.

Forney et al., "Efficient Modulation for Bank-Limited Channels", IEEE Journal on Selected Areas of Communications, vol. SAC-2, No. 5, Sep. 1984, pp. 632-647.

Calderbank et al., "Four-Dimensional Modulation with an Eight-State Trellis Code", appeared in AT&T Tech. J., vol. 64, pp. 1005-1017, May-Jun. 1985.

M. Tomlinson, "New Automatic Equaliser Employing Modulo Arithmetic", Electronics Letters, vol. 7, 1971, pp. 138-139.

D. G. Messerschmitt, "Generalized Partial Response for Equalized Channels with Rational Spectra", IEEE (List continued on next page.)

Primary Examiner—Benedict V. Safourek
Attorney, Agent, or Firm—Fish & Richardson

[57] ABSTRACT

Apparatus for generating a (running digital sum) sequence of digital signals $X_k$ and/or a (partial response coded) sequence of digital signals $Y_k$, $K = 1, 2, \ldots$, such that $Y_k = X_k \pm X_{k-l}$, L and integer, in which the $Y_x$ signals are a sequence in a given modulation code. In one aspect, the signals $Y_k$ are chosen to be congruent to coset representatives specified in accordance with a modulation code, a plurality of code constellations are used, and at least one constellation includes both a point with a positive sum of coordinates and one with a negative sum of coordinates. In another aspect, the signals $X_k$ are chosen to be congruent to a sequence of alternate (precoded) coset representatives. In other aspects, the $Y_k$ alphabet signals are evenly spaced, and a selectable, e.g., an optimal, tradeoff between $S_x$ and $S_y$ is made. An N-dimentional modulation code is generated as a sequence of one-dimensional signals. A maximum likelihood sequence estimation decoder reconstructs the estimated running digital sum, and generates a signal whenever the estimated running digital sum is outside a permissible range. In another aspect, the decoder includes a modified maximum likelihood sequence estimator adapted to find MQ partial decoded sequences, where Q is the number of encoder states, and M is an integer.

36 Claims, 14 Drawing Sheets

OTHER PUBLICATIONS

Transactions on Communications, vol. COM-23, No. 11, 1975, pp. 1251-1258.

R. Price, "Nonlinearly Feedback-Equalized PAM vs. Capacity, for Noisy Filter Channels", Proc. ICC, Jun., 1972, pp. 22-12 to 22-17.

J. E. Mazo, "On the Transmitted Power in Generalized Partial Response", IEEE Transactions on Communications, vol. COM-24, No. 3, 1976, pp. 348-351.

H. Harashima et al., "Matched-Transmission Technique for Channels with Intersymbol Interference", IEEE Transactions on Communications, vol. COM-20, No. 4, 1972, pp. 774-780.

Calderbank et al., "New Trellis Codes", Mathematical Sciences Research Center, AT&T Bell Laboratories, appeared in IEEE Trans. Inform. Theory, vol. IT-33, pp. 177-195, 1987.

Calderbank et al., "An Eight-Dimensional Trellis Code", Proceedings of the IEEE, vol. 74, No. 5, May 1986, pp. 757-759.

Forney, "Maximum-Likelihood Sequence Estimation of Digital Sequences in the Presence of Intersymbol Interference", IEEE Transactions on Information Theory, vol. IT-18, No. 3, May 1972, pp. 363-378.

Lee, "A New Class of Codes Designed for Partial Response Channels", Cornell University, 1986.

Morales-Moreno et al., "Matched Encoders in Combined Binary Trellis Encoding and Systems with Memory", Communications Group Technical Report, Jan. 1987.

Calderbank et al., "Binary Convolutional Codes with Applications to Magnetic Recording", IEEE Trans., vol. IT-32, No. 6, Nov. 1986, pp. 797-815.

Justesen, "Information Rates and Power Spectra of DIgital Codes", IEEE Trans., vol. IT-28, No. 3, May 1982, pp. 457-472.

Wolf et al., "Trellis Coding for Partial-Response Channels", IEEE Trans., vol. COM-34, No. 8, Aug. 1986, pp. 765-773.

Ketchum, "Trellis Coding for Partial Response Channels", Telecommunications Research Laboratory GTE, Jan. 10, 1987.

A. R. Calberbank et al., "Basebank Trellis Codes with a Spectral Null at Zero", IEEE Transactions on Information Theory, vol. 34, No. 3, May, 1988, pp. 425-434.

A. R. Calderbank et al., "Binary Convolutional Codes with Applications to Magnetic Recording", IEEE Transactions on Information Theory, vol. IT-32, No. 6, Nov., 1986, pp. 797-815.

$X_{k-1}$ POSITIVE $X_{k-1}$ NEGATIVE

PARTIAL RESPONSE CHANNEL SIGNALING SYSTEMS

This is a continuation of copending application Ser. No. 07/208,867 filed on June 15, 1988, now abandoned, which was a continuation of Ser. No. 018,345 filed on Feb. 24, 1987, now abandoned.

BACKGROUND OF THE INVENTION

This invention relates to modulation coding and partial response systems.

In modulation coding, symbols are encoded as signals drawn from a constellation in such a way that only certain sequences of signals are possible.

In recent years, a number of kinds of trellis-type modulation codes have been developed and applied (e.g., in modems) to realize coding gains of 3 to 6 dB over high-signal-to-noise-ratio, band-limited channels such as voice grade telephone channels.

Early trellis codes were due to Ungerboeck (Cjsaka et al., U.S. Pat. No. 3,877,768; Ungerboeck, "Channel Coding with Multilevel/Phase Signals," *IEEE Transactions on Information Theory*, Vol. IT-28, pp. 55-67, January 1982). Ungerboeck's codes for sending n bits per symbol are based on 4-subset or 8-subset partitions of one-dimensional (PAM) or two-dimensional (QAM) $2^{n+1}$-point signal constellations, combined with a rate-$\frac{1}{2}$ or rate-$\frac{2}{3}$ linear binary convolutional code that determines a sequence of subsets. A further set of "uncoded" bits then determines which signal points within the specified subsets are actually sent. The partition and the code are designed to guarantee a certain minimum squared distance $d_{min}^2$ between permissible sequences of signal points. Even after giving effect to the power cost of an expanded signal constellation (a factor of four (6 dB) in one dimension, or a factor of two (3 dB) in two dimensions), the increase in minimum squared distance yields a coding gain that ranges from about a factor of two (3 dB) for simple codes up to a factor of four (6 dB) for the most complicated codes, for values of n that may be as large as desired.

Gallager (U.S. Pat. No. 4,755,998, continuation of U.S. application Ser. No. 577,044, filed Feb. 6, 1984, discussed in Forney et al., "Efficient Modulation for Band-Limited Channels," *IEEE J. Select. Areas Commun.*, Vol. SAC-2, pp. 632-647, 1984) devised a multidimensional trellis code based on a 16-subset partition of a four-dimensional signal constellation, combined with a rate-$\frac{3}{4}$ convolutional code. The four-dimensional subset is determined by selecting a pair of two-dimensional subsets, and the points of the four-dimensional signal constellation are made up of pairs of points from a two-dimensional signal constellation. With only an 8-state code, a $d_{min}^2$ of four times the uncoded minimum sequence distance can be obtained, while the loss due to expanding the signal constellation can be reduced to about a factor of $2^{\frac{1}{2}}$ (1.5 dB), yielding a net coding gain of the order of 4.5 dB. A similar code was designed by Calderbank and Sloane ("Four-dimensional Modulation With An Eight-State Trellis Code", *AT&T Tech. J.*, Vol. 64, pp. 1005-1018, 1985; U.S. Pat. No. 4,581,601).

Wei (U.S. patent application Ser. No. 727,398, filed Apr. 25, 1985, now allowed as U.S. Pat. No. 4,713,817) devised a number of multidimensional codes based on partitions of constellations in four, eight, and sixteen dimensions, combined with rate-$(n-1)/n$ convolutional codes. His multidimensional constellations again consist of sequences of points from two-dimensional constituent constellations. The codes are designed to minimize two-dimensional constellation expansion, to obtain performance (coding gain) versus code complexity over a broad range, and for other advantages such as transparency to phase rotations. Calderbank and Sloane, "New Trellis Codes", *IEEE Trans. Inf. Theory*, to appear March, 1987; "An Eight-dimensional Trellis Code," *Proc. IEEE*, Vol. 74, pp. 757-759, 1986 have also devised a variety of multidimensional trellis codes, generally with similar performance versus complexity, more constellation expansion, but in some cases fewer states.

All of the above codes are designed for channels in which the principal impairment (apart from phase rotations) is noise, and in particular for channels with no intersymbol interference. The implicit assumption is that any intersymbol interference introduced by the actual channel will be reduced to a negligible level by transmit and receive filters; or, more specifically, by an adaptive linear equalizer in the receiver. Such a system is known to work well if the actual channel does not have severe attenuation within the transmission bandwidth, but in the case of severe attenuation ("nulls" or "near nulls") the noise power may be strongly amplified in the equalizer ("noise enhancement").

A well-known technique for avoiding such "noise enhancement" is to design the signaling system for controlled intersymbol interference rather than no intersymbol interference. The best-known schemes of this type are called "partial response" signaling schemes (Forney, "Maximum Likelihood Sequence Estimation of Digital Sequences in the Presence of Intersymbol Interference," *IEEE Trans. Inform. Theory*, Vol. IT-18, pp. 363-378, 1972).

In a typical (one-dimensional) partial response scheme, the desired output $y_k$ at the receiver is designed to be the difference of two successive inputs $x_k$, i.e., $y_k = x_k - x_{k-1}$, rather than $y_k = x_k$. In sampled-data notation using the delay operator D, this means that the desired output sequence $y(D)$ equals $x(D)(1-D)$ rather than $x(D)$; this is thus called a "$1-D$" partial response system. Because the spectrum of a discrete-time channel with impulse response $1-D$ has a null at zero frequency (DC), the combination of the transmit and receive filters with the actual channel likewise must have a DC null to achieve this desired response. On a channel which has a null or a near null at DC, a receive equalizer designed for a $1-D$ desired response will introduce less noise enhancement than one designed to produce a perfect (no intersymbol interference) response.

Partial response signaling is also used to achieve other objectives, such as reducing sensitivity to channel impairments near the band edge, easing filtering requirements, allowing for pilot tones at the band edge, or reducing adjacent-channel interference in frequency-division multiplexed systems.

Other types of partial response systems include a $1+D$ system which has a null at the Nyquist band edge, and a $1-D^2$ system which has nulls at both DC and the Nyquist band edge. A quadrature (two-dimensional) partial response system (QPRS) can be modeled as having a two-dimensional complex input; the (complex) response $1+D$ results in a QPRS system which has nulls at both the upper and lower band edges in a carrier-modulated (QAM) bandpass system. All of these partial response systems are closely related to one another, and schemes for one are easily adapted to another, so one can design a system for the 1−D response, say, and easily extend it to the others.

Calderbank, Lee, and Mazo ("Baseband Trellis Codes with A Spectral Null at Zero"; submitted to *IEEE Trans. Inf. Theory*) have proposed a scheme to construct trellis-coded sequences that have spectral nulls, particularly at DC, a problem that is related to the design of partial response systems, even though its objectives are in general somewhat different. Calderbank et al. have adapted known multidimensional trellis codes with multidimensional signal constellations to produce signal sequences with spectral nulls by the following technique. The multidimensional signal constellation has twice as many signal points as are necessary for the non-partial-response case, and is divided into two equal size disjoint subsets, one of multidimensional signal points whose sum of coordinates is less than or equal to zero, the other whose sum is greater than or equal to zero. A "running digital sum" (RDS) of coordinates, initially set to zero, is adjusted for each selected multidimensional signal point by the sum of its coordinates. If the current RDS is nonnegative, then the current signal point is chosen from the signal subset whose coordinate sums are less than or equal to zero; if the RDS is negative, then the current signal point is chosen from the other subset. In this way the RDS is kept bounded in a narrow range near zero, which is known to force the signal sequence to have a spectral null at DC. At the same time, however, the signal points are otherwise chosen from the subsets in the same way as they would have been in a non-partial-response system: the expanded multidimensional constellation is divided into a certain number of subsets with favorable distance properties, and a rate-$(n-1)/n$ convolutional code determines a sequence of the subsets such that the minimum squared distance between sequences is guaranteed to be at least $d_{min}^2$. The coding gain is reduced by the constellation doubling (by a factor of $2^{\frac{1}{2}}$, or 1.5 dB, in four dimensions, or by a factor of $2^{\frac{1}{4}}$, or 0.75 dB in eight), but otherwise similar performance is achieved as in the non-partial response case with similar code complexity.

SUMMARY OF THE INVENTION

One general feature of the invention is generating a sequence of digital signals $x_k$ and/or a sequence of digital signals $y_k$ (the sequence $y_k$ being in accord with a given modulation code), $k=1, 2, \ldots$, such that the relationship between the $x_k$ signals and $y_k$ signals is $y_k = x_k \pm x_{k-L}$, L an integer. An encoder selects J signals $y_k$, $J \geq 1$, $(y_k, y_{k+1}, \ldots y_{k+J-1})$ to be congruent to a sequence of J coset representatives $c_k$ (modulo M), M an integer, specified in accordance with the given modulation code, the J symbols being chosen from one of a plurality of J-dimensional constellations, the choice being based on a previous $x_{k'}$, $k' < k$. At least one of the constellations includes both a point with a positive sum of coordinates, and another point with a negative sum of coordinates. The encoder is arranged so that the signals $x_k$ have finite variance $S_x$.

Another general feature of the invention is that the encoder selects the signals $x_k$ to be congruent to a sequence of alternative coset representatives $c'_k$ (modulo M), where $$c'_k = c_k - c'_{k-L} \text{ (modulo M), in the case where}$$

$$y_k = x_k + x_{k-L},$$

$$c'_k = c_k + c'_{k-L} \text{ (modulo M), in the case where}$$

$$y_k = x_k - x_{k-L}.$$

Another general feature of the invention is that the $y_k$ signals fall within an alphabet of possible $y_k$ signals that are spaced apart within the alphabet evenly by a spacing $\Delta$, and the encoder causes the sequence $y_k$ to have a variance $S_y$ less than $2S_0$ and the sequence $x_k$ to have a variance $S_x$ not much greater than $S_y^2/4(S_y - S_0)$, $S_0$ being approximately the minimum signal power required to represent n bits per signal with a $\Delta$-spaced alphabet.

Another general feature of the invention is that the encoder causes the $x_k$ and $y_k$ signals to have any selected variances $S_x$ and $S_y$ within predetermined ranges.

In preferred embodiments, the ranges are controlled by a parameter $\beta$, $S_x$ is approximately $S_0/(1-\beta^2)$, and $S_y$ is approximately $2S_0/(1+\beta)$.

Another general feature of the invention is apparatus for generating a sequence in a given N-dimensional modulation code, by generating a sequence of one-dimensional signals based on coded and uncoded bits, the modulation code being based on an N-dimensional constellation partitioned into subsets associated with the code, the subsets each representing a plurality of N-dimensional signals, the apparatus comprising an encoder for deriving, for each N-dimensional symbol, a set of N, M-valued one-dimensional coset representatives $c_k$ corresponding to congruence classes of each of the N coordinates (modulo M) of the symbol, each coset representative designating a subset of one-dimensional values in a one-dimensional constellation of possible coordinate values for each of the N dimensions, each one-dimensional signal in the sequence being selected from the possible coordinate values based on uncoded bits.

In preferred embodiments, either the $x_k$ or $y_k$ sequence may be delivered as an output; $L=1$; $y_k = x_k - x_{k-L}$; the code may be a trellis code or a lattice code; M may be 2 or 4 or a multiple of 4 or $2+2i$; J may be 1 or the same as the number of dimensions in the modulation code; $k' = k - 1$; J is 1 and each constellation is a one-dimensional range of values centered on $\beta x_{k-1}$, $0 \leq \beta < 1$, preferably $\beta > 0$; there are a finite set of (e.g., two non-disjoint) J-dimensional constellations; $y_k$ and $x_k$ may be real valued or complex valued.

Another general feature is a decoder for decoding a sequence $z_k = y_k + n_k$, $k = 1, 2, \ldots$, into a decoded sequence $y_k$, where the sequence of signals $y_k$ is such that (a) the sequence is from a given modulation code; (b) the running digital sum $x_k = y_k + y_{k-1} + y_{k-2} + \ldots$ has finite variance $S_x$; (c) the signals $y_k$ fall in a predetermined permissible range dependent on $x_{k'}$, $k' < k$; and the sequence $n_k$ represents noise. A range violation monitor reconstructs the estimated running digital sum $\hat{x}_k = \hat{y}_k + \hat{y}_{k-1} + \ldots$, compares the decoded sequence $\hat{y}_k$ with a predetermined permissible range based on the estimated running digital sum $\hat{x}_{k'}$, $k' < k$, and generates an indication whenever the $\hat{y}_k$ is outside the permissible range.

Another general feature of the invention is a decoder for decoding a sequence $z_k = y_k + n_k$, $k = 1, 2, \ldots$, where the sequence of signals $y_k$ is such that (a) the sequence is from a given modulation code, the code being capable of being generated by an encoder with a finite number Q of states; (b) $y_k = x_k \pm x_{k-L}$, L an integer, where the sequence $x_k$ has finite variance $S_x$, and the sequence $n_k$ represents noise, comprising a modified maximum likelihood sequence estimator adapted to find MQ partial decoded sequences, up to some time K, one sequence for each combination of the finite number Q of states and each of a finite number M of integer-spaced values modulo M, such that each sequence (a) is in the code up to the time K; (b) corresponds to the encoder being in a given state at the time K; (c) corresponds to a value of $x_k$ at the time K that is congruent to a given one of the values, modulo M.

The invention adapts known modulation codes, particularly trellis codes, for use in partial response systems to achieve the same kinds of advantages that trellis codes have in non-partial response systems—notably, substantial coding gains for arbitrarily large numbers n of bits/symbol with reasonable decoding complexity. The invention also enables the design of trellis codes for partial response systems in such a way as to achieve both a relatively low input signal power $S_x$ and a relatively low output power $S_y$, and permits smoothly trading off these two quantities against each other. Furthermore, higher-dimensional trellis codes can be adapted for use in partial response systems which are inherently lower-dimensional.

Other advantages and features will become apparent from the following description of the preferred embodiments, and from the claims.

DESCRIPTION OF THE PREFERRED EMBODIMENTS

We first briefly describe the drawings.

DRAWINGS

FIG. 33 shows two disjoint constellations.

STRUCTURE AND OPERATION

Figure 1:
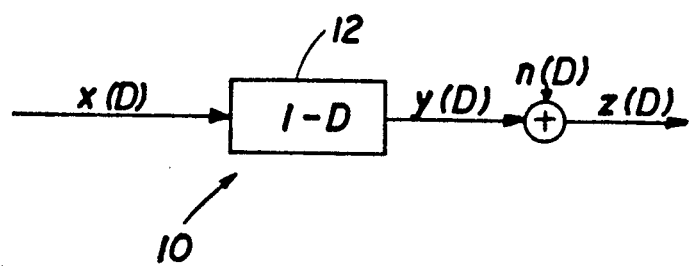
FIG. 1 is a block diagram of a 1−D partial response channel.

Referring to FIG. 1, the invention includes a technique for generating signal sequences to be used as inputs for a partial response channel 10, for example a one-dimensional (real) 1−D partial response baseband system with a null at DC. (Later we shall indicate briefly how to modify such a design for other types of partial response systems.) Each output signal $z_k$ of such a system is given by $$z_k = y_k + n_k.$$

where the $n_k$ sequence (n(D)) represents noise, and the $y_k$ sequence (y(D)) is a partial-response-coded (PRC) sequence defined by $$y_k = x_k - x_{k-1},$$

where the $x_k$ sequence (x(D)) is the sequence of channel inputs. Because $$x_k = x_{k-1} + y_k,$$

the $x_k$ sequence can be recovered from the PRC sequence by forming a running digital sum of the $y_k$ values (given an initial value for the $x_k$ sequence); thus we call the $x_k$ sequence the RDS sequence. The sample variances of the RDS sequence x(D) and the PRC sequence y(D) will be denoted as $S_x$ and $S_y$, respectively.

The discrete-time partial response 1−D (represented by block 12) is a composite of the responses of a chain of transmit filters, an actual channel, receive filters, equalizers, samplers, etc., designed in a conventional way to achieve a composite partial response 1−D with the noise power P (of the noise sequence n(D)) being small relative to the PRC power $S_y$. We shall thus want to send a relatively large number n of bits per channel input. A detector (not shown) operates on the noisy PRC sequence z(D) to estimate x(D) (or equivalently y(D), since there is a one-to-one relationship between them). If the detector is a maximum likelihood sequence estimator, then, to first order, the objective is to maximize the minimum squared distance $d_{min}^2$ between permissible PRC sequences y(D).

In some applications, the design constraint will simply be to minimize the sample variance $S_x$ of the RDS (input) sequence. In others, the constraint will be on $S_y$. In still other applications, there will be an effective power constraint somewhere in the middle of the composite filter chain, so that it will be desirable to keep both $S_x$ and $S_y$ small, and in fact to provide for a smooth design tradeoff between them.

A related problem is the design of sequences with spectral nulls, e.g., a null at zero frequency (DC). There the objective may be to design sequences y(D) that can represent n bits per sample, that have a spectral null, that have as small a sample variance $S_y$ as possible, but that also have a large minimum squared distance $d_{min}^2$ between possible y(D) sequences. A common auxiliary objective is to keep the variation of the running digital sum (RDS) of the y(D) sequence limited as well, for systems reasons. Because the running digital sum sequence x(D) is, e.g., y(D)/(1−D), and its sample variance $S_x$ is a measure of its variation, the present invention may also be applicable to the design of sequences with spectral nulls.

A number of design principles are useful in achieving our objectives. The first principle is to design the input (RDS) sequence x(D) so that the output (PRC) sequence y(D), taken N values at a time, is a sequence of N-dimensional signal points belonging to subsets of an N-dimensional constellation determined by a known N-dimensional trellis code. Then the minimum squared distance $d_{min}^2$ between PRC sequences will be at least the $d_{min}^2$ guaranteed by the trellis code. Furthermore, a maximum likelihood sequence estimator for the trellis code can be easily adapted for use with this system, and while perhaps not optimum, it will achieve the same effective $d_{min}^2$ for essentially the same decoding complexity as for the same trellis code in a non-partial response system.

Figure 2:
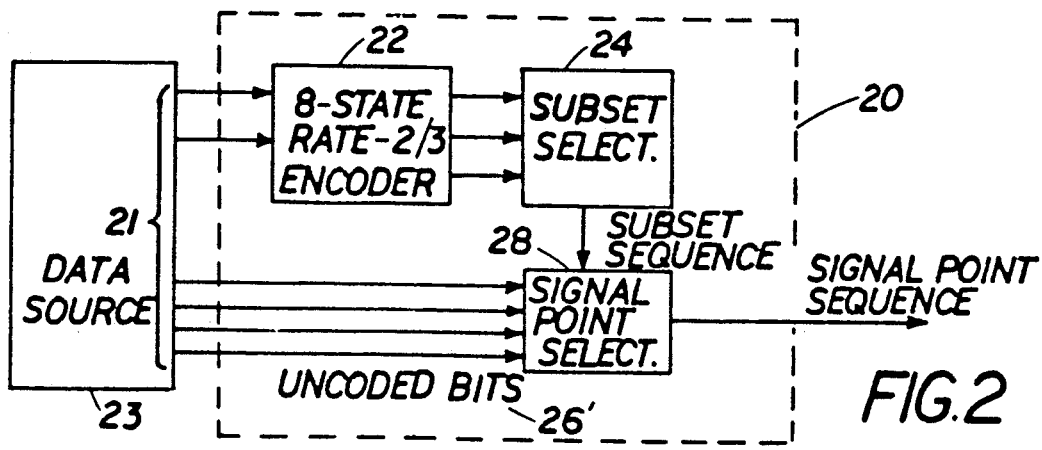
FIG. 2 is a block diagram of an encoder for an 8-state Ungerboeck code.

An illustrative embodiment of the present invention is based on a known 8-state 2-dimensional trellis code similar to that of Ungerboeck as described in the article cited above, which uses a 128-point two-dimensional constellation to send 6 bits per (two-dimensional) signal. (This is also similar to the code used in CCITT Recommendation V.33 for a 14.4 kbps data modem.) FIG. 2 shows the encoder 20 for this code. For each six-bit symbol 21 delivered from a data source 23, 2 of the 6 input bits to encoder 20 enter a rate-$\frac{2}{3}$, 8-state convolutional encoder 22. The 3 output bits of this encoder are used in a subset selector 24 to select one of 8 subsets of a 128-point signal constellation, illustrated in FIG. 3; there are 16 points in each subset (points in the eight subsets are labelled A through H respectively). The remaining 4 "uncoded bits" 26 (FIG. 2) are used in a signal point selector 28 to select from the chosen subset the (two-dimensional) signal point to be transmitted. The code achieves a gain in $d_{min}^2$ of a factor of 5 (7 dB) over an uncoded system, but loses about 3 dB in using a 128-point rather than a 64-point constellation, so the net coding gain is about 4 dB.

One-dimensional Form of the 2-dimensional Ungerboeck Code

The sequence of symbols $x_k$ sent over the channel is one-dimensional in a 1−D baseband partial response system. It is helpful (though not essential), therefore, to transform known trellis codes into one-dimensional form. There are two aspects to this transformation: first, to characterize the two-dimensional subsets as compositions of constituent one-dimensional subsets, and second, to characterize the finite two-dimensional constellation as a composition of constituent one-dimensional constellations. We now show how this decomposition is done for the illustrative two-dimensional Ungerboeck code, and then indicate how it may be done in the general case of an N-dimensional trellis code.

The first step is to notice that each of the eight two-dimensional subsets A, B, . . . , can be viewed as the union of two smaller two-dimensional subsets, say $A_0$ and $A_1$, $B_0$ and $B_1$, etc., where each of the 16 smaller subsets can be characterized as follows. Let the possible values of each coordinate of a signal point be partitioned into four classes a, b, c, d; then each of the smaller two-dimensional subsets consists of the points whose two coordinates are in a specified pair of classes. A convenient mathematical expression for this decomposition arises if we scale FIG. 3 so that signal points are one unit apart in each dimension (and the coordinates of each point are half-integers); then the classes a, b, c, d are equivalence classes (modulo 4), and each of the 16 sets $A_0$, $A_1$, $B_0$, . . . are the points whose two coordinates are congruent to a given pair (x, y) modulo 4, where x and y may each take on one of the four values {a, b, c, d}, e.g. $\{\pm\frac{1}{2}, \pm 3/2\}$. These four values are called (one-dimensional) 'coset representatives'. The points of the constellation of FIG. 3 have been labeled with 0s and 1s to show one possible arrangement of the 16 subsets. For example the $G_0$ point 29 has coordinates x=5/2, y=9/2, and its coset representatives are (5/2, 9/2) modulo 4 or (−3/2, $\frac{1}{2}$).

Figure 4:
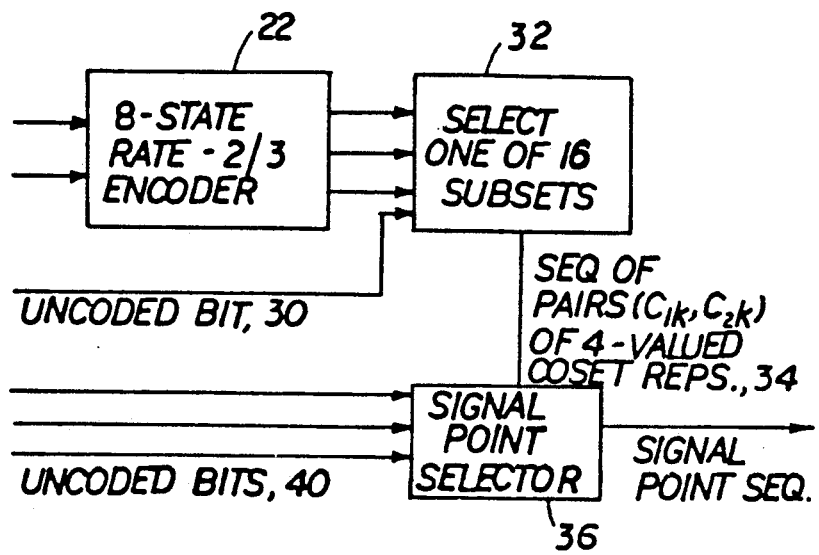
FIG. 4 is a block diagram of an equivalent encoder for the Ungerboeck code.

We may now modify FIG. 2 as follows. Referring to FIG. 4, the three output bits of the encoder 22 plus one of the uncoded bits 30 are used as inputs to subset selector 32, which selects one of 16 subsets based on the four input bits, with uncoded bit 30 selecting between $A_0$ and $A_1$, or $B_0$ and $B_1$, etc., according to which of the original 8 subsets is selected by the three convolutionally encoded bits produced by encoder 22. In effect, encoder 22 and bit 30 represent an 8-state rate-$\frac{3}{4}$ encoder, with the output selecting one of 16 subsets, although the set of possible signal point sequences has not changed. Next, designate each of these 16 smaller subsets by a pair of one-dimensional coset representatives 34, one for each coordinate, where each coset representative $c_k$ may take on one of four values. The pair of coset representatives is denoted $(c_{1k}, c_{2k})$.

An aspect of the invention is the observation that all of the good codes cited above—i.e., those of Ungerboeck, Gallager, Wei, and Calderbank and Sloane—can be transformed in the same way. That is, any of these N-dimensional trellis codes can be generated by an encoder that selects one of $4^N$ subsets, where the subsets are specified by N 4-valued one-dimensional coset representatives, corresponding to congruence classes of each coordinate (modulo 4). In some cases it is only necessary to use $2^N$ subsets specified by N 2-valued one-dimensional coset representatives (e.g., $\{\pm\frac{1}{2}\}$) corresponding to congruence classes of each coordinate (modulo 2); e.g., for Ungerboeck's 4-state 2D code, Gallager's 8-state 4D code (and the similar code of Calderbank and Sloane), Wei's 16-state 4D code and 64-state 8D code, etc. Also, we have observed that many good lattice codes can be transformed in this way; e.g., the Schläfli lattice $D_4$ and the Gosset lattice $E_8$ can be represented by sequences of 4 or 8 two-valued one-dimensional coset representatives (modulo 2); the Barnes-Wall lattices $A_{16}$ and $A_{32}$ and the Leech lattice $A_{24}$ can be represented by four-valued one-dimensional coset representatives (modulo 4).

Figure 5:
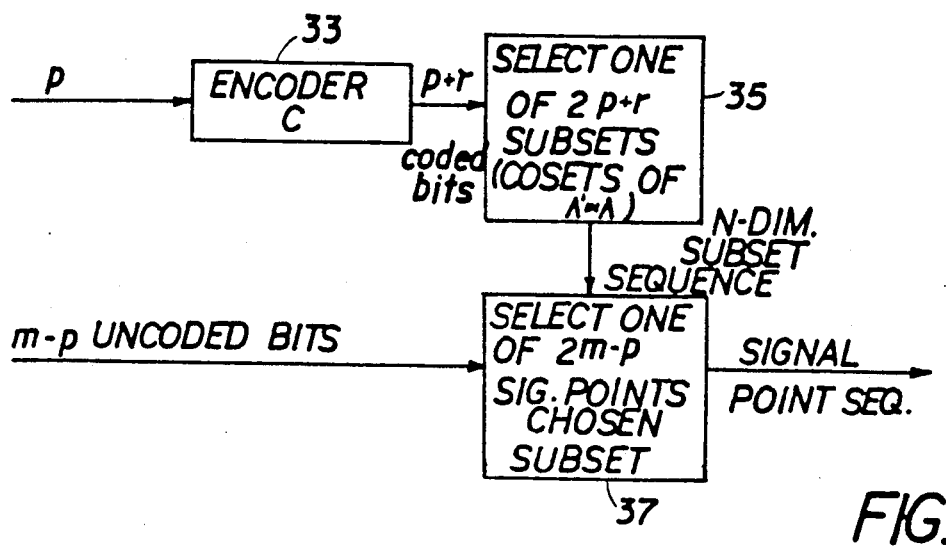
FIG. 5 is a block diagram of a generalized N-dimensional trellis encoder.

A general form for all of these codes is shown in FIG. 5. The encoder is N-dimensional and operates once for every N signals to be sent over the channel. In each operation, p bits enter a binary encoder C 33 and are encoded into p+r coded bits. These coded bits select (in selector 35) one of $2^{p+r}$ subsets of an N-dimensional signal constellation (the subsets corresponding to the $2^{p+r}$ cosets of a sublattice $\Lambda'$ of an N-dimensional lattice $\Lambda$, the constellation being a finite set of $2^{n+r}$ points of a translate of the lattice $\Lambda$, such that each subset contains $2^{n-p}$ points). A further n−p uncoded bits selects (in selector 37) a signal point from the selected subset. Thus the code transmits n bits for every N-dimensional symbol, using a constellation of $2^{n+r}$ N-dimensional signal points. The encoder C and the lattice partition $\Lambda/\Lambda'$ ensure a certain minimum squared distance $d_{min}^2$ between any two signal point sequences that belong to a possible subset sequence.

Figure 6:
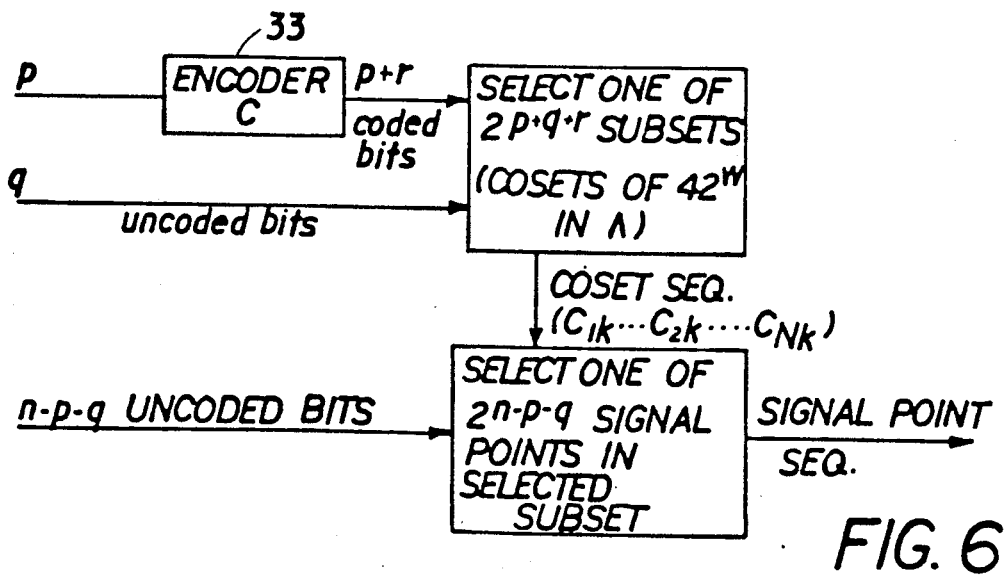
FIG. 6 is a block diagram of a modified FIG. 5, based on coset representatives.

The observation above (about the transformability of all good codes) is the result of the mathematical observation that for all of the good trellis and lattice codes cited, the lattice $4Z^N$ of N-tuples of integer multiples of 4 is a sublattice of the lattice $\Lambda'$ (and in some cases $2Z^N$ is). Then, for some integer q, $\Lambda'$ is the union of $2^q$ cosets of $4z^N$ in $\Lambda'$. The practical effect of this observation is that, provided that $n \geq q+p$, we can take the $p+r$ coded bits plus q uncoded bits into a subset selector that selects one of $2^{q+p+r}$ cosets of $4Z^N$ in $\Lambda$, and further that these cosets can be identified by a sequence of N 4-valued one-dimensional coset representatives ($c_{1k}, c_{2k}, \ldots, c_{Nk}$), where the $c_{jk}$ represent integer-spaced equivalence classes (modulo 4). Thus already FIG. 5 can be modified as shown in FIG. 6. In this modification, we assume that the $2^{n+r}$-point signal constellation divides evenly into $2^{q+p+r}$ subsets, each containing the same number of signal points ($2^{n-q-p}$).

The illustrative Ungerboeck code embodiment is an example in which $N=2$, $\Lambda = Z^2$, $\Lambda' = 2RZ^2$, $p=2$, $p+r=3$, $q=1$, and $n=6$.

The second step is to decompose the constellation into constituent one-dimensional constellations. For the constellation of FIG. 3, each coordinate can take on one of 12 values which can be grouped as 8 'inner points' (e.g., $\{\pm \frac{1}{2}, \pm 3/2, \pm 5/2, \pm 7/2\}$) and 4 'outer points' (e.g., $\{\pm 9/2, \pm 11/2\}$), as suggested by boundary 31 in FIG. 3. There are 2 inner points and 1 outer point in each of the four one-dimensional equivalence classes (e.g., the class whose coset representative is $+\frac{1}{2}$ contains the two inner points $+\frac{1}{2}$ and $-7/2$, and the outer point 9/2, because these three points are congruent to $+\frac{1}{2}$ (modulo 4). Given a coset representative, therefore, it is only necessary to specify whether a point is an inner point or an outer point and, if an inner point, which of the two inner points it is. This can be done with two bits, say $b_{1k}$ (=inner or outer) and $b_{2k}$ (=which inner) (or with one three-valued parameter $a_k$).

We may say that the pair ($b_{1k}, b_{2k}$) is a range identifying parameter $a_k$, which takes on one of three values, indicating the following three ranges (a) from 0 to 4 (inner point, positive);
(b) from $-4$ to 0 (inner point, negative);
(c) from $-6$ to $-4$ and from 4 to 6 (outer point). The fact that each range spans a portion of the real line of total width 4 that contains exactly one point congruent to any real number (modulo 4) means that the range-identifying parameter $a_k$ plus the coset representative $c_k$ specify a unique signal point, for any value of $c_k$.

Figure 7:
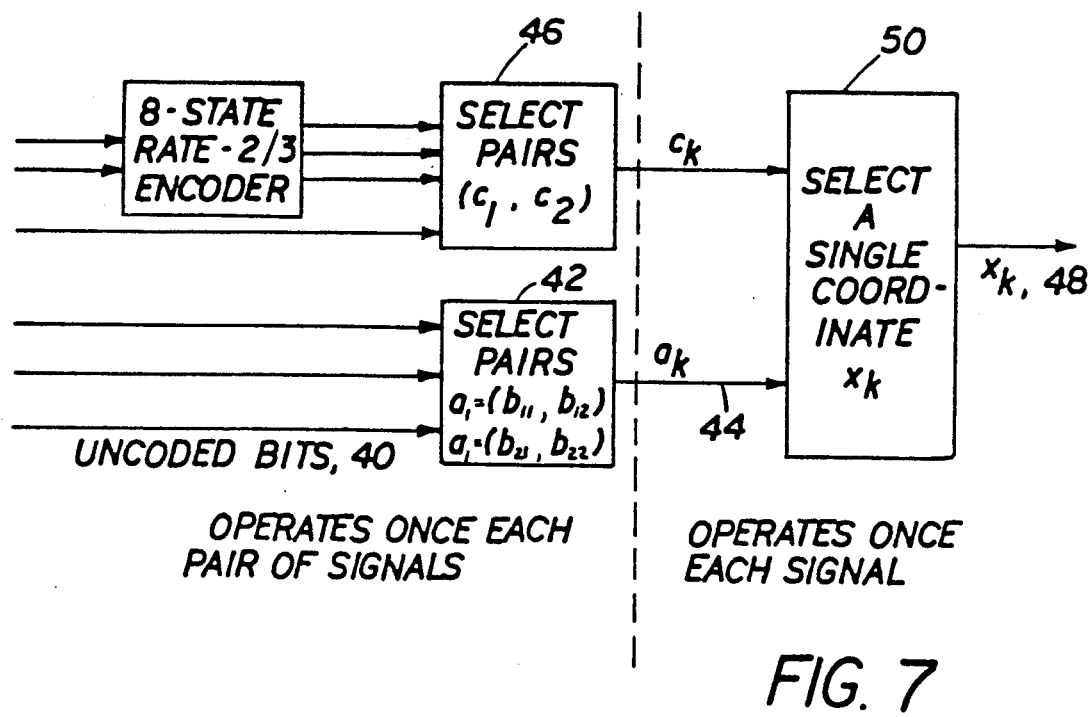
FIG. 7 is a block diagram of an equivalent one-dimensional encoder.

The signal point selector 36 of FIG. 4 can then be decomposed as follows. Referring to FIG. 7, three uncoded bits 40 enter a range-identifying parameter selection element 42 for each pair of coordinates. One uncoded bit determines whether any outer point is sent. If so, a second bit then determines which coordinate will contain the outer point, and the third bit selects which inner point in the other coordinate. If not, both coordinates are inner points, and the second and third bits select which inner point in each coordinate. Thus, in sum, element 42 maps the three uncoded input bits 40 into two pairs of output bits 44 $a_1 = (b_{11}, b_{12})$, and $a_2 = (b_{21}, b_{22})$, with each pair of bits used to determine one coordinate in conjunction with the corresponding coset representative, $c_1$ or $c_2$, generated by coset representative pair selector 46. Thus the whole encoder has been reduced to a form in which each coordinate $x_k$ (48) is selected (in a coordinate selector 50) by 4 bits, two representing $c_k$ and two representing $a_k = (b_{1k}, b_{2k})$.

All constellations commonly used with the a above-cited codes can be decomposed in this way. The principles are similar to those discussed in my U.S. Pat. No. 4,597,090 and in Forney et al., "Efficient Modulation . . . " cited above, where N-dimensional constellations were built up from constituent 2-dimensional constellations; a similar buildup from 2-dimensional constituent constellations was used by Wei in conjunction with trellis codes in his U.S. patent application, cited above.

Figure 8:
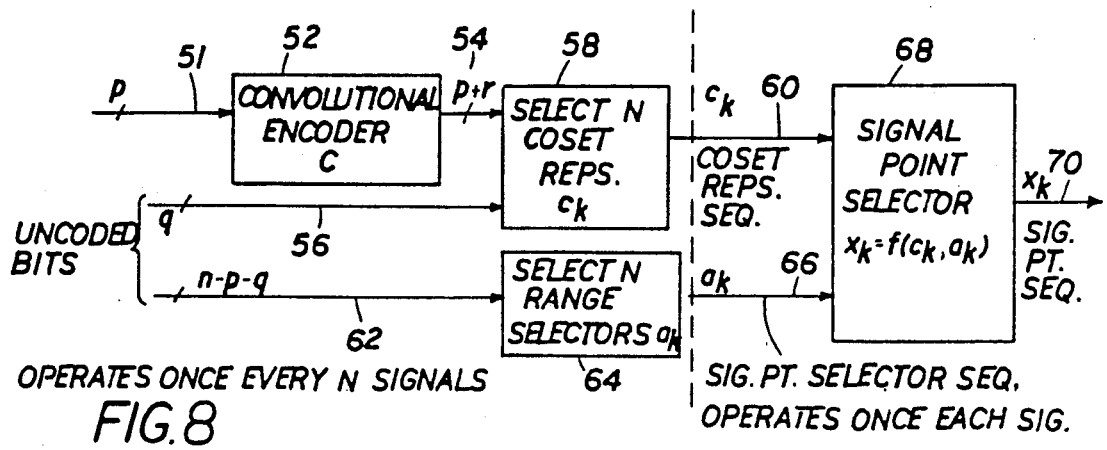
FIG. 8 is a block diagram of a generalized N-dimensional trellis encoder.

The general form of encoder for N-dimensional codes is shown in FIG. 8. For every N coordinates, p bits 51 enter an encoder 52 and p+r coded bits 54 are produced; these plus q uncoded bits 56 enter a selector 58 which selects a sequence of N coset representatives $c_k$(60); the remaining $n-p-q$ uncoded bits 62 are transformed (in a selector 64) into a sequence of range-identifying parameters $a_k$ (66) which together with the $c_k$ determine (in a signal point selector 68) a sequence of N signal point values $x_k$ (70) by a signal point selection function $f(c_k, a_k)$ which operates on a one-dimensional basis. In general, the range-identifying parameter $a_k$ determines a subset of the real line (one-dimensional constellation) of width (measure) 4 which contains exactly one element congruent to any possible $c_k$ value (modulo 4), and the function $f(c_k, a_k)$ selects that element. For all codes cited, the coset representative alphabet may be taken as four integer-spaced values (modulo 4); for some codes, the coset representative alphabet may be taken as two integer-spaced values (modulo 2) (in which case the ranges are of width 2). The size of the $a_k$ alphabet is as large as necessary to send n bits per N coordinates. The signal point sequences generated by this form of encoder are generally the same as those in the original code, and in particular, are separated by the same minimum squared distance $d_{min}^2$ as the original code.

Coset Precoding

Figure 9:
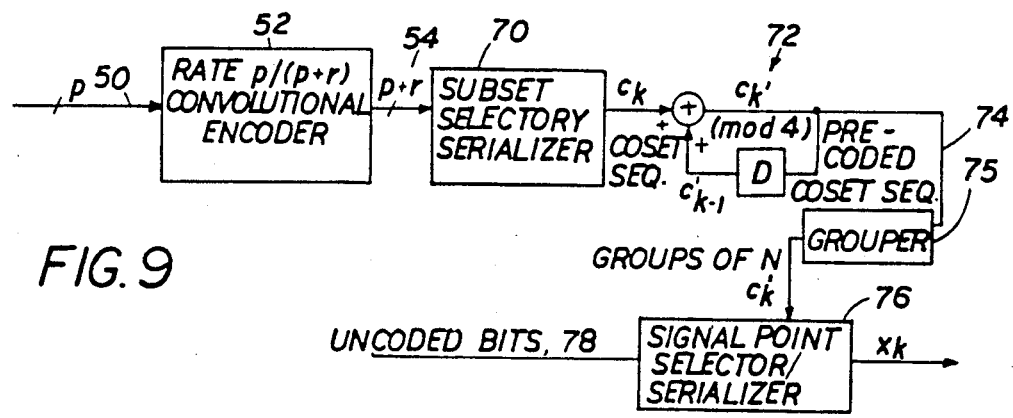
FIG. 9 is a block diagram of a generalized encoder with coset precoding.

N-dimensional signal point sequences generated by known good trellis codes, when serialized to one-dimensional signal points, cannot in general be used as inputs to the partial response channel of FIG. 1 without degradation of $d_{min}^2$ (because of intersymbol interference). However, a technique which we call coset precoding allows the adaptation of these known codes to partial response systems without increase of $S_x$ or degradation of $d_{min}^2$. The general technique is illustrated in FIG. 9.

We use the same convolutional encoder 52 as used by the known trellis code, preferably in the form of FIG. 8. The $p+r$ coded output bits 54, rather than selecting a subset directly, are converted (as in FIG. 8) in a subset selector/serializer 70 into a sequence $c_k$ of N one-dimensional coset representatives $c_1, \ldots, c_N$, corresponding to the subset that would be selected in a non-partial response system. These coset representatives are then 'precoded' (in a precoder 72) into an alternative (or 'precoded') coset representative sequence $c_k'$ (74), where $c_k' = c_{k-1}' + c_k$ (modulo 4)

(In the cases where it is possible to use modulo 2 coset representatives, this precoding can be done modulo 2.) Thus the precoded coset representative sequence 74 is a running digital sum modulo 4 (or 2) of the ordinary coset representative sequence. Precoded coset representatives $c_k'$ can then be grouped N at a time in grouper 75 to specify (in signal point selector/serializer 76) an N-dimensional subset; a signal point can then be selected (based on the uncoded bits 78) in the usual way; and the resulting signal point can be sent out as a sequence x(D) of N one-dimensional signals $x_k$ over the partial response channel (in the same order as they were precoded).

Note that if the $c_k$ are half-integers, then the $c_k'$ alternate between two sets of 4 values, one set displaced by ½ from the other. This has only a minor effect; we can, for example, "dither" alternating coordinates $x_k$ by $+\frac{1}{4}$ and $-\frac{1}{4}$ so as to accommodate this periodicity. Alternatively, we may let the $c_k$ alphabet be integer-valued, e.g., {0, 1, 2, 3}; then the $c_k'$ are always from the same alphabet, e.g., $\{\pm\frac{1}{2}, \pm 3/2\}$. These offsets of $c_k'$ or $c_k$ do not affect the $d_{min}^2$ of the code.

Figure 10:
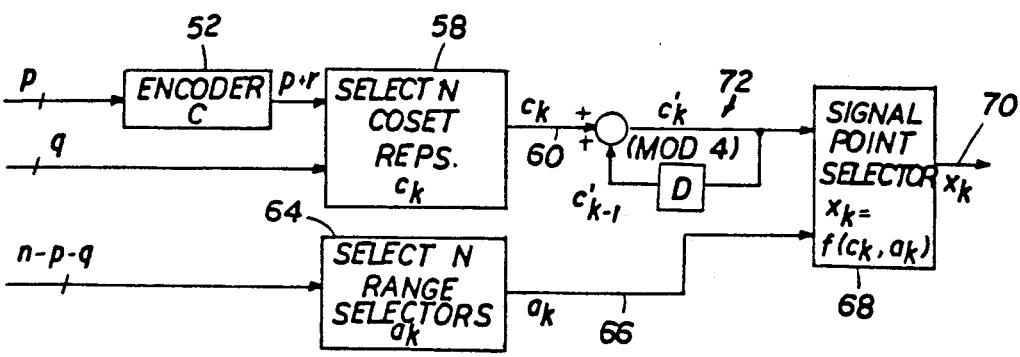
FIG. 10 is a block diagram combining FIGS. 8 and 9.

If the encoder is in the form of FIG. 8, then FIG. 9 can be put in the form of FIG. 10, where the same blocks do the same things. In particular, since we have characterized the function $f(c_c, a_k)$ as one that selects the unique element congruent to $c_k$ in a range identified by $a_k$, it does not matter if the precoding changes the $c_k'$ alphabet from the $c_k$ alphabet; indeed, the (modulo 4) in the precoder is unnecessary in principle, though possibly useful in practice.

With either FIG. 9 or FIG. 10, it can be shown that the PRC sequence $y_k = x_k - x_{k-1}$ has elements that are congruent to $c_k$ (modulo 4), so they fall in the subsets of the original trellis code, and therefore have at least the same $d_{min}^2$. The RDS sequence $x_k$ has the same average energy $S_x$ as in the original trellis code if the $c_k'$ alphabet is the same as the $c_k$ alphabet; even if not, approximate equality still holds. (In the illustrative embodiment, the average energy per coordinate is 10.25, with integer-spaced signals.) If the $c_k$ are integers, the $x_k$ are independent, identically distributed random variables, and thus (a) $S_y = 2S_x$;
(b) the spectrum of the RDS sequence $\{x_k\}$ is flat (white) within its Nyquist band;
(c) the spectrum of the PRC sequence $\{y_k\}$ is the same as that of the partial response channel.

Even if the $c_k$ are not integers, these statements are still approximately true.

Coset precoding can be modified for other kinds of partial response systems as follows. For a $1+D$ (one-dimensional) partial response system, use the same system except with $c_{k-1}'$ subtracted rather than added in precoder 72, so that $c_k' = c_k - c_{k-1}'$ (modulo 4). For a $1-D^L$ system, replace the delay element D by a delay element $D^L$, so that $c_k' = c_{k-L}' + c_k$. For a $1+D$ two-dimensional system, use two $1+D$ precoders in parallel, with pairs of outputs from the subset selector/serializer 60 as inputs, and with the two outputs determining the real and imaginary (in-phase and quadrature) parts of the two-dimensional signal point to be transmitted.

RDS Feedback

Depending on the application, it may be desirable to reduce the average energy $S_y$ of the PRC sequence, at the cost of increasing the average energy $S_x$ of the RDS sequence. This will also tend to flatten the PRC spectrum, while raising the low-frequency content of the RDS spectrum. Justesen, "Information Rates and Power Spectra of Digital Codes", *IEEE Trans. Inform. Theory*, Vol. IT-28, pp. 457-472, 1982, has introduced the notion of a "cutoff frequency" $f_o$ below which the PRC spectrum is small and above which it tends toward flatness, and has shown that $f_o$ is approximated by $f_o \approx (S_y/2S_x)f_N$, where $f_N$ is the Nyquist band edge frequency.)

A general method of performing this tradeoff while maintaining the $d_{min}^2$ of the trellis code in the PRC sequences is to augment the encoder of FIGS. 9 or 10 as follows.

Figure 11:
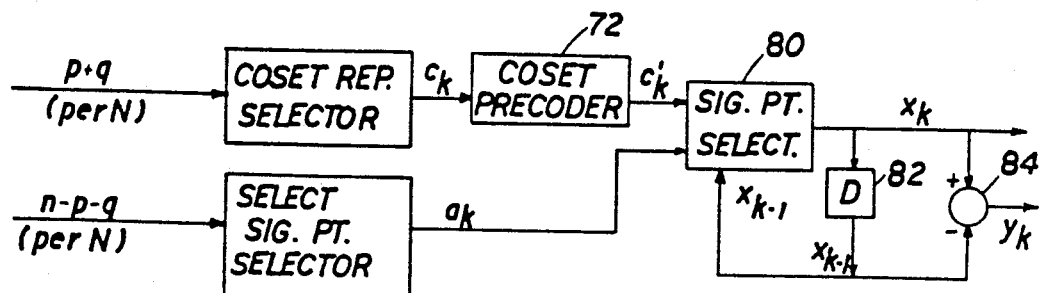
FIG. 11 is a block diagram of an encoder with RDS feedback and coset precoding.

The PRC sequence may be computed from the RDS sequence; for the $1-D$ channel, each PRC signal is just $y_k = x_k - x_{k-1}$. Referring to FIG. 11, we may let the signal point selector 80 base each $x_k$ on $x_{k-1}$ (by feeding $x_k$ back through a delay element 82) as well as on the current precoded coset representative $c_k'$ and on the range-identifying parameter $a_k$, in such a way that large PRC values $y_k$ (calculated in summer 84) are avoided. As long as the signals $x_k$ are still chosen to be congruent to the $c_k'$ (modulo 4), the signals $y_k$ will be congruent to the $c_k$ (modulo 4), and therefore will preserve the $d_{min}^2$ of the trellis code. (Note that although the idea is to precompute the PRC value $y_k$ to keep it small, what is actually fed back 20 is the previous RDS value $x_{k-1}$, so that we call this RDS feedback.)

For the illustrative embodiment, this could work as follows. As already noted, the normal selection function $f(c_k, a_k)$ of selector 80 can be characterized by saying that the 8 inner points are the 8 half-integer values lying in the range from $-4$ to $+4$, while the 4 outer points are the 4 half-integer values lying in the range from $-6$ to $-4$ and $+4$ to $+6$. We can vary the inner point range and outer point range as a function of $x_{k-1}$, as long as the inner point range spans 8 signal points, 2 from each equivalence class, while the outer point range spans 4 signal points, 1 from each equivalence class.

A general way of doing this is to translate all ranges by a translation variable $R(x_{k-1})$ which is a function of $x_{k-1}$. That is, in the illustrative embodiment, the inner point range is modified to be from $-4 + R(x_{k-1})$ to $4 + R(x_{k-1})$, and the outer point range to be from $-6 + R(x_{k-1})$ to $-4 + R(x_{k-1})$ and from $4 + R(x_{k-1})$ to $6 + R(x_{k-1})$.

The function $R(x_{k-1})$ should be generally increasing with $x_{k-1}$ so as to reduce the $y_k$. We have been able to show that the optimum choice is $R(x_{k-1}) = \beta x_{k-1}$, where $\beta$ is a parameter in the range $0 \leq \beta < 1$. When $\beta = 0$, the RDS feedback through element 82 disappears and FIG. 11 reduces to coset precoding as in FIG. 10. With this choice, if $S_0$ is the value of $S_x$ in the ordinary case ($\beta = 0$), then it is approximately true that (a) $S_x = S_0/(1 - \beta^2)$;
(b) $S_y = 2S_0/(1 + \beta)$;
(c) The spectrum $S_x(f)$ of the RDS sequence is proportional to $1/(1 - 2\beta \cos\theta + \beta^2)$, where $\theta = \pi f/f_N$;
(d) The spectrum $S_y(f)$ of the PRC sequence is proportional to $2(1 - \cos\theta)/(1 - 2\beta\cos\theta + \beta^2)$; the "cutoff frequency" $f_0$ is $(1-\beta)f_N$.
(e) The $x_k$ are limited to the range form $-M/2(1+\beta)$ to $M/2(1-\beta)$, and the $y_k$ are limited to the range $-M$ to M, if the range of coordinates in the orignal code is from $-M/2$ to $M/2$.

As $\beta$ approaches a flat spectrum with a sharp null at DC. Meanwhile, approaches a flat spectrum with a sharp null at DC. Meanwhile, $S_x$ becomes large and $S_x(f)$ approaches a $1/(1-D)$ spectrum, except that it remains finite near DC. We have been able to show that this is the best possible tradeoff between $S_x$, $S_y$, and $S_0$.

Figure 12:
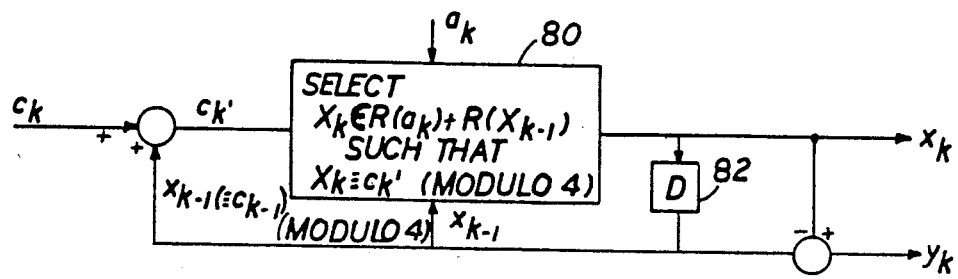
FIGS. 12, 13, 14 are alternative embodiments of FIG. 11.
Figure 13:
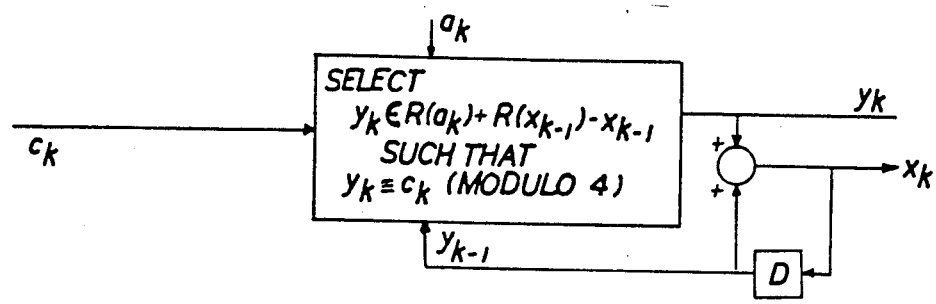
Figure 14:
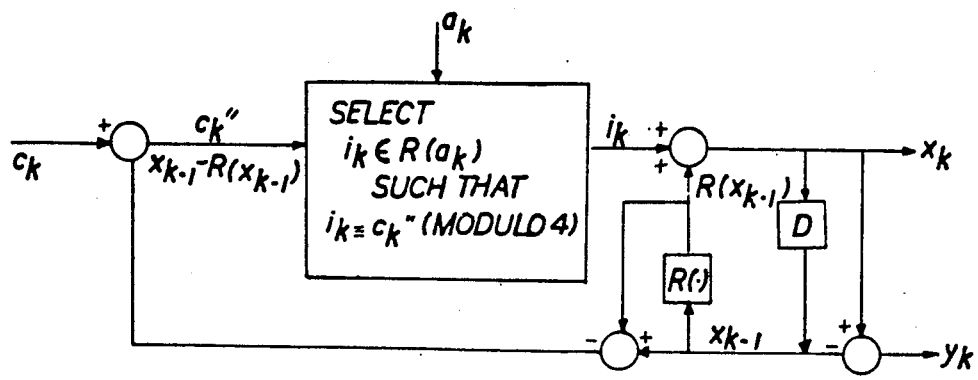

FIGS. 12, 13, 14 show three equivalent ways of generating $x_k$ and/or $y_k$ based on $c_k$, $a_k$, and $x_{k-1}$. FIG. 12 corresponds most closely to FIG. 11.

In FIG. 12, the feedback variable $c'_{k-1}$ in coset precoder 72 is replaced by $x_{k-1}$, since $c'_{k-1} \equiv x_{k-1}$ (modulo 4), and only the value of $c'_{k(modulo\ 4)}$ is used in selector 80. $R(a_k)$ denotes the range identified by $a_k$, and $R(x_{k-1})$ represents the range translation variable introduced by RDS feedback. Since $y_k = x_k - x_{k-1} \equiv c'_k - x_{k-1}$ (modulo 4) and $c'_k \equiv c_k + x_{k-1}$ (modulo 4), $y_k \equiv c_k$ (modulo 4).

FIGS. 13 and 14 are mathematically equivalent to FIG. 12, in the sense that if they have the same starting value $x_{k-1}$ and the same sequence of inputs ($c_k$, $a_k$), they will produce the same sets of outputs ($x_k$, $y_k$). In FIG. 13, $y_k$ is chosen as the unique element congruent to $c_k$ in the range $R(a_k) + R(x_{k-1}) - x_{k-1}$, and $x_k$ is determined from $y_k$ as $x_k = y_k + x_{k-1}$, so $x_k \equiv c'_k \equiv c_k + x_{k-1}$ (modulo 4), and is the unique element in the range $R(a_k) + R(x_{k-1})$ congruent to $c'_k$ (modulo 4). In FIG. 14, an innovations variable $i_k$ is chosen as the unique element congruent to $c''_k \equiv c_k + x_{k-1} - R(x_{k-1})$ (modulo 4) in the range $R(a_k)$, and $x_k$ is determined from $i_k$ as $x_k = i_k + R(x_{k-1})$, so $x_k \equiv c''_k + R(x_{k-1}) \equiv c_k'$ (modulo 4), and is the unique element in the range $R(a_k + R(x_{k-1})$ congruent to $c'_k$ (modulo 4). FIG. 12 combines the delay element in the precoder with the delay element necessary for RDS feedback, and is most useful if $x_k$ is the desired output and the $c'_k$ are always from the same is the desired output and the $c'_k$ are always from the same alphabet, e.g. $\{\pm\frac{1}{2}, \pm 3/2\}$. FIG. 13 eliminates the precoder altogether, and is most useful if $y_k$ is the desired output and the $c_k$ are always from the same alphabet, e.g. $\{\pm\frac{1}{2}, \pm 3/2\}$. FIG. 14 takes the range translation variable $R(x_{k-1})$ outside of the selector, so that the $i_k$ are always chosen from the same range (the union of all $R(a_k)$); the innovations sequence $i(D)$ is approximately a sequence of independent identically distributed random variables $i_k$ (ignoring the minor variations induced by the $c'_k$ congruence constraint) and this auxiliary sequence can be useful if a white (spectrally flat) sequence deterministically related to $x(D)$ or $y(D)$ is desired.

Figure 15:
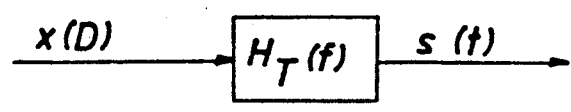
FIGS. 15, 16, 17 are block diagrams of three equivalent filtering arrangements.
Figure 16:
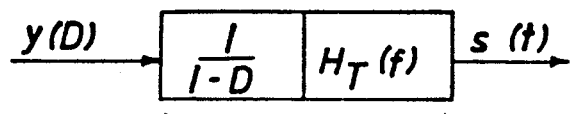
Figure 17:
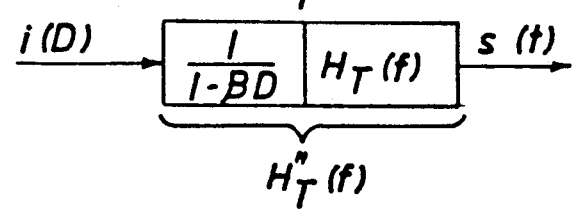

FIGS. 15, 16, 17 illustrate three equivalent filtering arrangements for use with the $x(D)$, $y(D)$, and $i(D)$ sequences of FIGS. 12, 13, 14. In FIG. 15, the RDS sequence $x(D)$ is filtered in a transmit filter $H_T(f)$ before being transmitted (as signal $s(t)$) over the actual channel (not shown). In FIG. 16, the PRC sequence $y(D)$ is filtered in a transmit filter $H'_T(f)$ whose response is equivalent to that of a cascade of a $1/(1-D)$ sampled-data filter and $H_T(f)$; since $y(D)$ has a DC null, it does not matter that the response of $1/(1-D)$ is infinite at DC (particularly if $H_T(f)$ also has a DC null). In FIG. 17, the innovations sequence $i(D)$ is filtered in a transmit filter $H''_T(f)$ whose response is equivalent to that of a cascade of a $1/(1-\beta D)$ sampled-data filter and $H_T(f)$; this is equivalent to FIGS. 15, 16 if $R(x_{k-1}) = \beta x_{k-1}$; otherwise, the equivalent sampled-data filter is the filter corresponding to $x_k = i_k + R(x_{k-1})$, in general nonlinear. Any one of these equivalent forms may be preferable depending on $H_T(f)$, $R(x_{k-1})$, and the implementation technology being used.

Certain modifications of the above RDS feedback systems may be desirable in practice. For example, it may be desirable to change the form of the ranges $R(a_k)$ from those used when $R(x_{k-1})=0$. For example, in the illustrative embodiment, a simply implemented form of RDS feedback is as follows: when $x_{k-1}$ is positive, let $y_k$ be chosen as usual in the range from $-4$ to 4 if $a_k$ indicates an inner point, but if $a_k$ indicates an outer point, let $y_k$ be the number congruent to $c_k$ in the range from $-4$ to $-8$; when $x_{k-1}$ is negative, use the range from 4 to 8 for outer points. Then (a) the range of the PRC sequence $y_k$ is limited to $-7\frac{1}{2}$ to $+7\frac{1}{2}$, rather than $-11$ to 11 when there is no RDS feedback;

(b) the PRC variance $S_y$ is reduced to 13.25 from 20.5, a reduction of 1.9 dB, and about 1.1 dB above $S_0 = 10.25$;

(c) the mean of $y_k$ is $-3/2$ if $x_{k-1}$ is positive, and $+3/2$ if $x_{k-1}$ is negative, so that the RDS sequence tends to remain in the neighborhood of zero. While it is difficult to compute $S_x$ exactly, it follows from the facts that $E[y_k x_{k-1}] = S_y/2$ and $E[y_k x_{k-1}] = -(3/2)E[|x_{k-1}|51]$ that the mean of the absolute value of $x_k$ is $S_y/3 = 4.42$, so that the RDS sequence $x_k$ is fairly well bounded. (With no RDS feedback, the mean of the absolute value of $x_k$ is 2.75);

(d) the variance of the $y_k$, given $x_{k-1}$, is $S_0 = 11$, about 0.3 dB higher than the $S_0 = 10.25$ possible with no RDS feedback. The minimum possible $S_x$ for $S_y = 13.25$, $S_0 = 11$, is $S_x \approx 19.5$, corresponding to $\beta \approx 0.66$. Since $S_x = S_{|x|} + E[|x|]^2$, $S_x$ must be greater than $(4.92)^2 \approx 19.5$, so with this simple method we achieve less than the optimal spectral tradeoff; (e) every possible $y_k$ is associated with a unique pair ($c_k$, $a_k$). As we shall discuss in more detail below, this means that a decoder need not keep track of an estimated running digital sum of the estimated PRC sequence, and that there will be no error propagation in the decoder.

In summary, this simple method does not achieve the best power tradeoff between $S_x$ and $S_y$, but does effectively limit not only $S_y$ but also the peak values of $y_k$, keeps the RDS sequence $x_k$ fairly well bounded, and avoids error propagation at the receiver.

Thus these methods allow for trading off of $S_x$ versus $S_y$(i) from the unconstrained case, where the $x_k$ sequence is uncorrelated, $S_x$ has the same energy $S_0$ as is necessary to send n bits per symbol in the non-partial-response case, and $S_y = 2S_x$, (ii) almost to the case where the $y_k$ sequence is uncorrelated, $S_y = S_0$, and $S_x$ becomes very large. These tradeoffs are possible for all trellis and lattice codes cited.

Decoding

The above methods succeed in generating PRC sequences that belong to a known good code, and therefore have a $d_{min}^2$ at least as great as that of the code.

Figure 18:
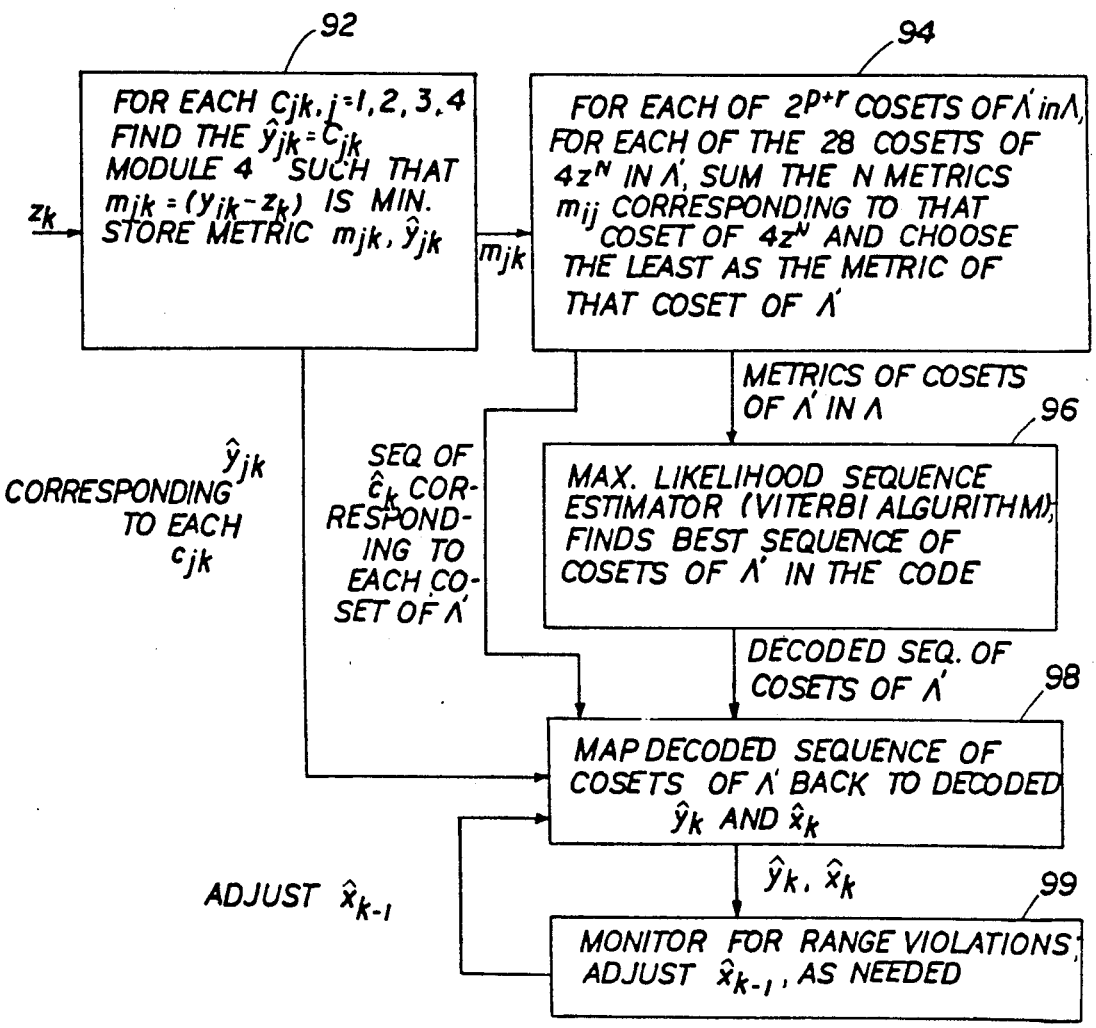
FIG. 18 is a block diagram of a generalized decoder.

Referring to FIG. 18, a suitable detector for the noise received PRC sequence $z(D) = y(D) + n(D)$ is therefore a maximum likelihood sequence estimator (Viterbi algorithm) for the known good code, adapted as follows:

(a) A first step of decoding may be, for each noisy received PRC value $z_k = y_k + n_k$, for each of the four classes of real numbers congruent to the four one-dimensional coset representatives $c_{jk}$ (modulo 4), $j = 1,2,3,4$, find (block 92) the closest element $\hat{y}_{jk}$ in each class to $z_k$, and its 'metric' $m_{jk} = (\hat{y}_{jk} - z_k)^2$ (squared distance from $z_k$);

(b) In a code based on an N-dimensional lattice partition $\Lambda/\Lambda'$, a second step of decoding may be, for each of the $2^{p+r}$ cosets of $\Lambda'$ in $\Lambda$, to find the best (lowest metric) of the $2^q$ cosets of $4Z^N$ whose union is that coset of $\Lambda'$, by summing the respective metrics of the constituent one-dimensional metrics $m_{jk}$ and comparing these sums (block 94);

(c) Decoding can then proceed in the usual manner (block 96), using as a metric for each coset of $\Lambda'$ the best metric determined in step (b). The decoder will ultimately produce an estimate of the sequence of cosets of $\Lambda'$, which can be mapped to a sequence of estimated coset representatives $\hat{c}_k$, which can be mapped to the corresponding $\hat{y}_k$, from which the original $\hat{a}_k$ and $\hat{x}_k$ can be recovered if desired (block 98). These last steps require that the decoder keep track of the running digital sum $\hat{x}_{k-1}$ of the estimates $\hat{y}_k$.

Since the PRC sequences are in the known code, the error probability of this decoder will be at least as good as that of the known code, in the sense of achieving at least the same effective $d_{min}^2$. However, because the PRC sequences are actually only a subset of the known code sequences, such a decoder is not a true maximum likelihood sequence estimator for the PRC sequences. As a result, it may occasionally decode to a sequence which is not a legitimate PRC sequence. Legitimate PRC sequences must satisfy the two following additional conditions:

(a) A legitimate finite PRC sequence y(D) must be divisible by $1-D$; i.e., the sum of its coordinates must be zero;

(b) the range constraints imposed by the signal point selector must be satisfied for all $\hat{y}_k$ (or equivalently $\hat{x}_k$ or $\hat{a}_k$), based on the reconstructed values of the RDS $\hat{x}_{k-1}$.

If this decoder makes a normal decoding error, corresponding to a short period of wrong coset estimates followed by correct coset estimates, it is possible that the corresponding finite PRC error sequence will have a running digital sum other than zero. This will cause a persistent error in the decoder's estimated running digital sum $\hat{x}_{k-1}$, which may lead to occasional mapping errors back to the $\hat{y}_k$, $\hat{a}_k$, and ultimately $\hat{x}_k$, even though the cosets $\hat{c}_k$ are correct, for as long as the error in the RDS estimate persists.

The decoder must therefore continually monitor (block 99) whether the range constraints in the reconstructed $\hat{y}_k$ and $\hat{x}_k$ are satisfied. If they are not, then it knows that its estimated RDS $\hat{x}_{k-1}$ is incorrect; it should adjust $\hat{x}_{k-1}$ by the minimum amount necessary for the range constraint to be satisfied, assuming that the coset sequence is correct. With probability 1, this will eventually result in resynchronization of the estimated RDS to the correct value, and normal decoding can resume. However, there may be a considerable period of error propagation.

Avoidance of Error Propagation

We now give a general method of avoiding error propagation at the receiver. The method works best when the signal constellation consists of all points in $\Lambda$ within an N-cube, but is not restricted to that case. It may be regarded as a generalization of the principles of earlier forms of precoding (modulo M) for use with coded sequences.

The basic idea is that each possible PRC value $y_k$ should correspond to a unique $(c_k, a_k)$ value, when the code can be formulated in one-dimensional form as in FIG. 7; or, more generally, that each group of N $y_k$ values should correspond not only to a unique sequence of N $c_k$ values but also to a unique set of uncoded bits, if a general N-dimensional signal point selector is used as in FIG. 6. Then the inverse map from decoded $\hat{y}_k$ to coded and uncoded bits is independent of the decoder's estimate of the running digital sum, so that (a) the decoder need not keep track of the RDS;
(b) error propagation does not occur.

Thus in FIG. 18, block 99 can be eliminated.

Figure 19:
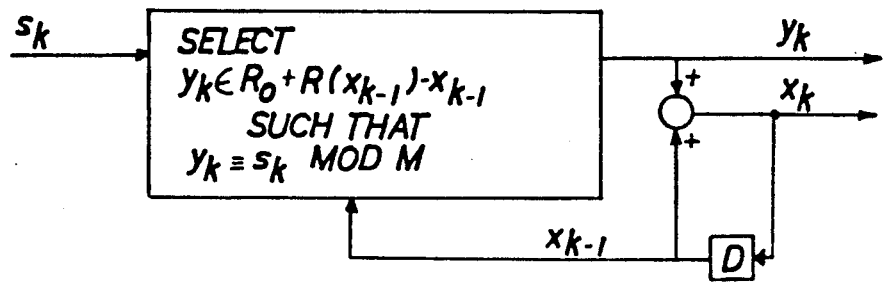
FIGS. 19, 20, 21 are block diagrams of alternative encoders.

FIG. 19 shows how this may be done where the code can be formulated in one-dimensional form, as in the illustrative embodiment. From $c_k$ and $a_k$, a signal point selector selects a value $s_k = f(c_k, a_k)$ as in FIG. 8. In the illustrative embodiment, $s_k$ takes on one of 12 values, namely, the half-integral values in the range from $-6$ to 6. In general, $s_k$ will take on one of the values from an integer-spaced alphabet in a range of width M; we denote this range by $R_0$. Then, as in FIG. 13, $y_k$ is selected as the unique number congruent to $s_k$ (modulo M) in the range $R_0 + R(x_{k-1}) - x_{k-1}$ of width M, where $R(x_{k-1})$ is an RDS signal point. The current RDS $x_k$ is computed as $y_k + x_{k-1}$.

Figure 20:
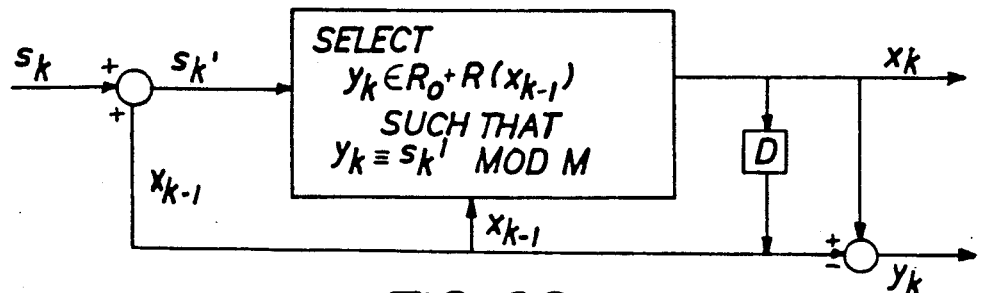
Figure 21:
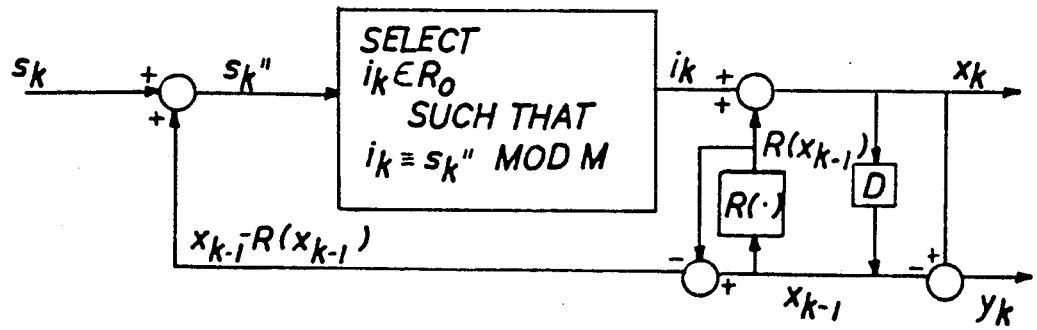

FIGS. 20 and 21 are equivalent methods of generating $x_k$ and/or $y_k$ from the sequence $s_k$ such that $y_k \equiv s_k$ (modulo M), analogous to FIGS. 12 and 14. In FIG. 21, an innovations variable $i_k$ is generated which is more or less white and uniformly distributed over the range $R_0$, so that its variance $S_0$ is approximately $M^2/12$; thus $S_0 \approx 12$ for the illustrative embodiment, a penalty of about 0.7 dB over the value of $S_0 = 10.25$ achievable with no RDS feedback. As in FIGS. 12, 13, 14, all three sequences $x_k$, $y_k$, and $i_k$ carry the same information, and as in FIGS. 15, 16, 17, any can be used as the input to a filter which shapes the spectrum for transmission.

The penalty in the innovations variance is eliminated if the original code coordinates are uniformly distributed over a range $R_0$; i.e., if the original constellation is bounded by an N-cube with side $R_0$.

Figure 3:
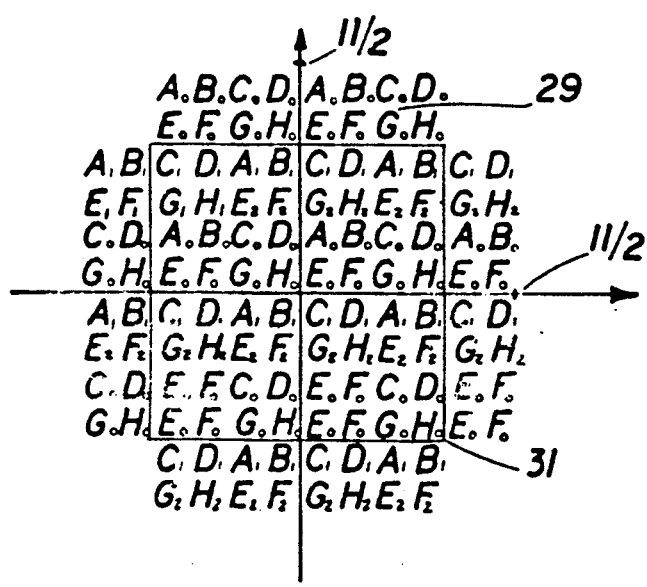
FIG. 3 is a signal constellation for the Ungerboeck code partitioned into 8 subsets.
Figure 22:
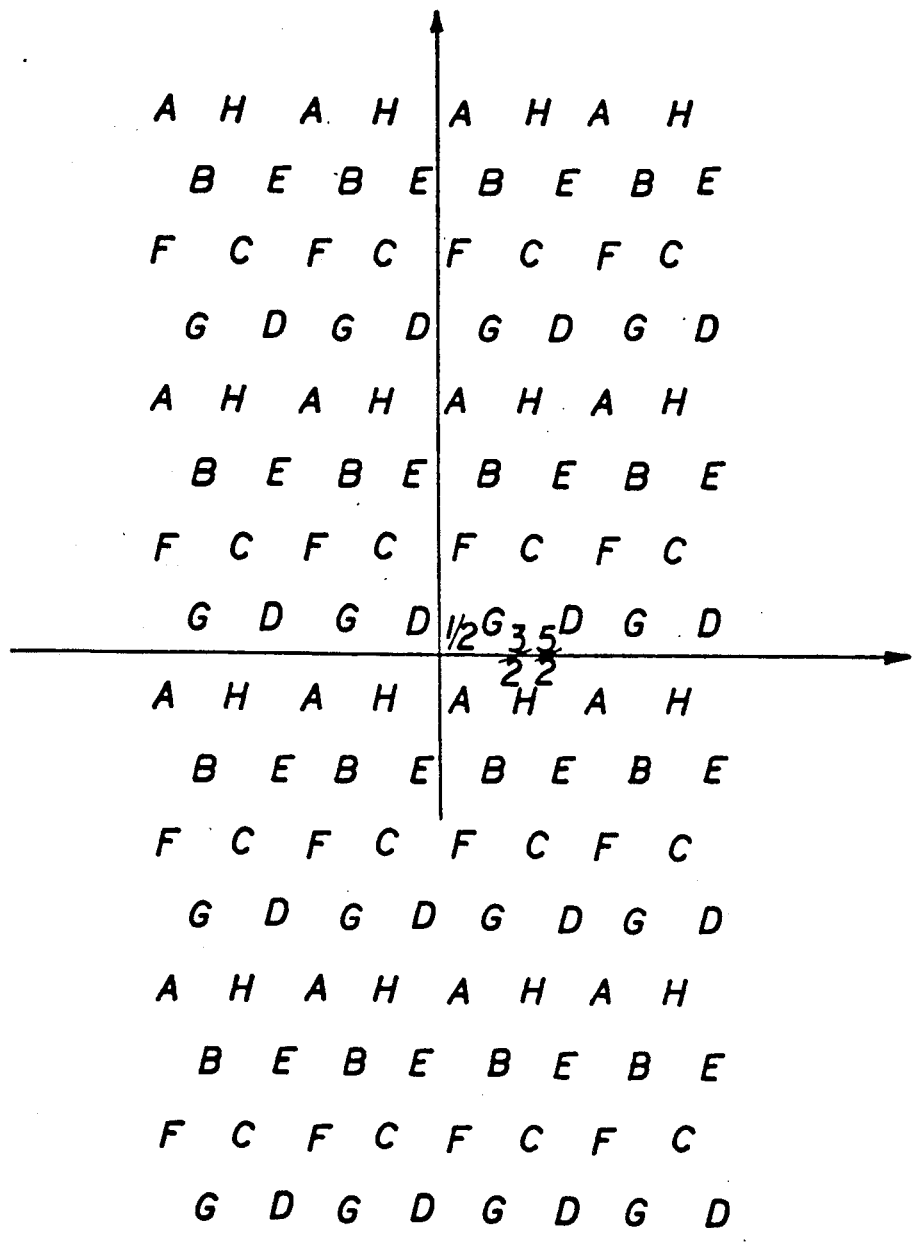
FIG. 22 is an alternative signal constellation.

As an illustrative embodiment with a square constellation, we use the same two-dimensional 8-state Ungerboeck encoder as in FIG. 2, except with the 128-point constellation of FIG. 22 rather than that of FIG. 3. The constellation consists of alternate points from the conventional 256-point $16 \times 16$ constellation; thus the coordinates have the 16 half-integral values $\{\pm \frac{1}{2}, \pm 3/2, \ldots, \pm 15/2\}$, but with the restriction that the sum of the two coordinates must be an even integer (0, modulo 2). The minimum squared distance between signal points is thus 2, rather than 1; and the $d_{min}^2$ of the code is 10, rather than 5. The variance of each coordinate is now 21.25 rather than 10.25, which after scaling by 2 is a loss of 0.156 dB relative to the FIG. 3 constellation, since the cross is more like a circle than is the square. (In lattice terminology, we are now using the 8-way lattice partition $RZ^2/4Z^2$ rather than $Z^2/2RZ^2$).

It will be observed that now each of the eight subsets corresponds to a unique pair of coset representatives $(c_1, c_2)$ modulo 4, such that $c_1 + c_2 = 0$ (modulo 2). Therefore, the three coded bits of FIG. 2 determine a pair of coset representatives directly in subset selector 24, rather than with the aid of an uncoded bit as in FIG. 4. The four uncoded bits then select one of the 16 points in the selected subset. In this case, the uncoded bits may simply be taken two at a time to determine one of the four ranges $-8$ to $-4$, $-4$ to 0, 0 to 4, or 4 to 8. This is conveniently expressed by letting the two-bit range identifying parameters $(a_1, a_2)$ each represent one of the four values $\{\pm 2, \pm 6\}$; then the coordinate selection function is simply $s_k = f(c_k, a_k) = c_k + a_k$. Note that the possible values for $s_k$ are the 16 half-integral values in the range $R_0$ from $-8$ to $8$, of width $M=16$.

Figure 23:
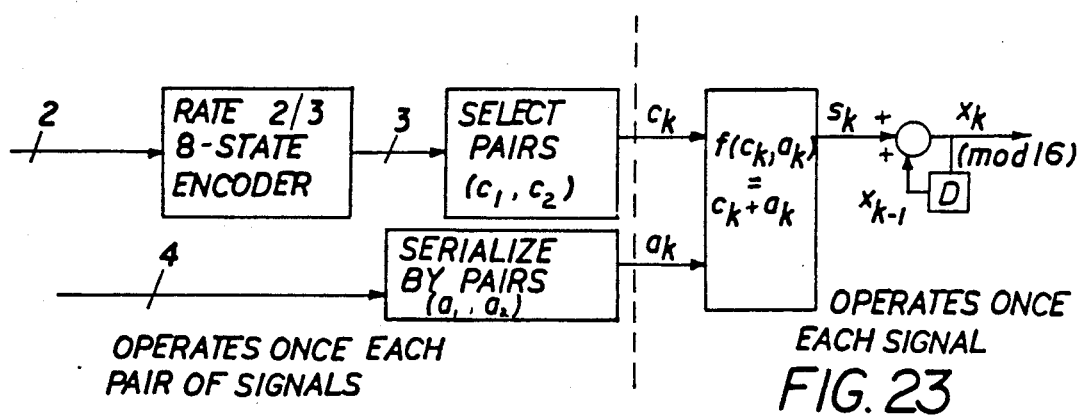
FIG. 23 is a block diagram of an encoder for use with the constellation of FIG. 22.

Conventional precoding may then be done modulo 16. The entire encoder is illustrated in FIG. 23. The RDS value $x_k$ is the sum $s_k + x_{k-1}$ (modulo 16). In this case the $x_k$ values are essentially independent identically distributed (white) random variables, and $y_k = x_k - x_{k-1} \equiv s_k$ (modulo 16).

Figure 24:
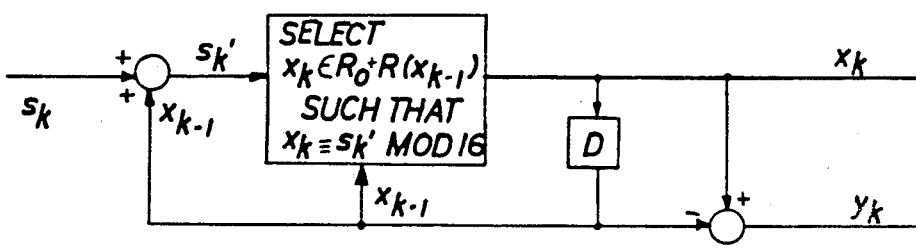
FIGS. 24, 25, 26 are block diagrams of three equivalent encoders.
Figure 25:
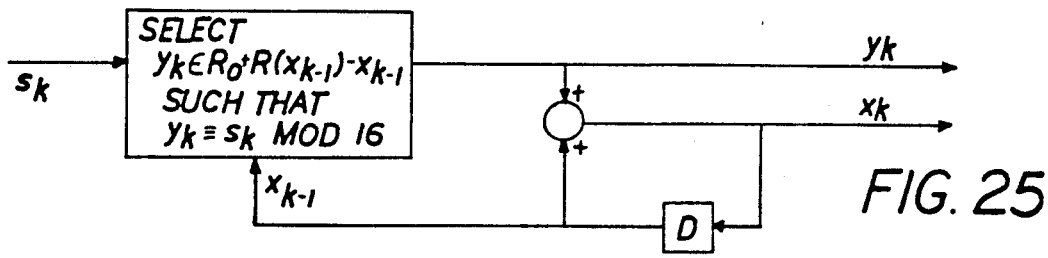
Figure 26:
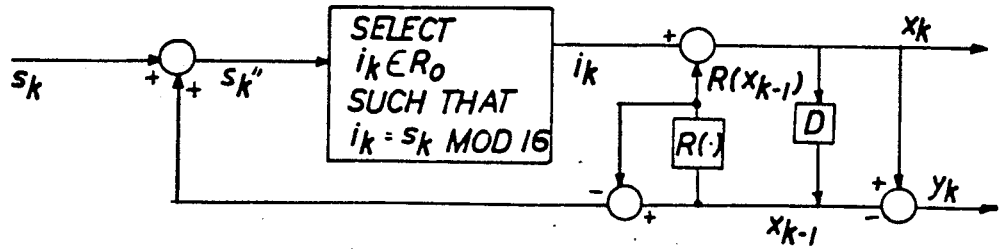

To obtain spectral tradeoffs via RDS feedback as in FIGS. 12, 13, 14, let $s_k$ continue to represent the desired congruence class of $y_k$ (modulo 16), and let $R(x_{k-1})$ be an RDS feedback variable as in FIGS. 12, 13, 14, ideally equal to $\beta x_{k-1}$. Then FIGS. 24, 25, 26 show three equivalent methods of obtaining sequences $x_k$ and/or $y_k = x_k - x_{k-1}$ such that $y_k \equiv s_k$ (modulo 16) and $S_k$ and $S_y$ have the desired tradeoff, given $S_0 = 21.25$. Here $R_0$ is the range from $-8$ to $8$.

In this case the innovations variable $i_k$ has variance $S_0 \simeq 16^2/12 = 21.33$, essentially the same as the variance of each coordinate in FIG. 22, so that there is no penalty beyond the 0.16 dB involved in using FIG. 22 rather than FIG. 3.

As already noted, the decoder need not keep track of the RDS, because, given the estimated PRC sequence $y_k$, the $c_k$, $a_k$, and ultimately the original input bit sequence are uniquely determined. However, if the decoder does keep track of the estimated RDS and the corresponding ranges that the $y_k$ should fall into, it can detect that an error has occurred whenever the decoded falls outside the estimated range. Even if not used for error correction, such range violation monitoring can yield an estimate of decoder error rate.

Augmented Decoders

A true maximum likelihood sequence estimator would take into account the entire state of the encoder and channel, which in general will include the value of the RDS $x_{k-1}$ (the channel state) as well as the state of the encoder C. Such a decoder would achieve the true $d_{min}^2$ of the PRC sequences, and would be free of error propagation. However, because $x_{k-1}$ in general takes on a large number of values, in principle possibly an infinite number with RDS feedback, such a decoder may not be practical. In addition, to achieve the true $d_{min}^2$ may require an essentially infinite decoding delay because the code/channel combination becomes quasi-catastrophic when n is large, as we shall explain more fully below.

It may be worth considering augmenting the decoder to at least achieve the true $d_{min}^2$ of the code, however. Because all finite PRC sequences are divisible by $1-D$, all finite-weight error sequences must have even weight. Thus, the true $d_{min}^2$ is always even. In the illustrative embodiment, the true $d_{min}^2$ is actually 6, not 5.

A general method for achieving the true $d_{min}^2$ in such cases while only doubling the effective number of states in the decoder is as follows. Let the decoder split each state of the encoder C into two, one corresponding to an even RDS and one to an odd. During decoding, two sequences then merge into the same state only if their estimated RDS has the same value (modulo 2). Thus, it becomes impossible for two sequences differing by an odd-weight error sequence to merge, so that the effective $d_{min}^2$ is the weight of the minimum even-weight error sequence in the original code. Further, if there is a decoding error that results in a persistent estimated RDS error, as discussed above, that error must be at least 2, so it will tend to be detected sooner.

Figure 27:
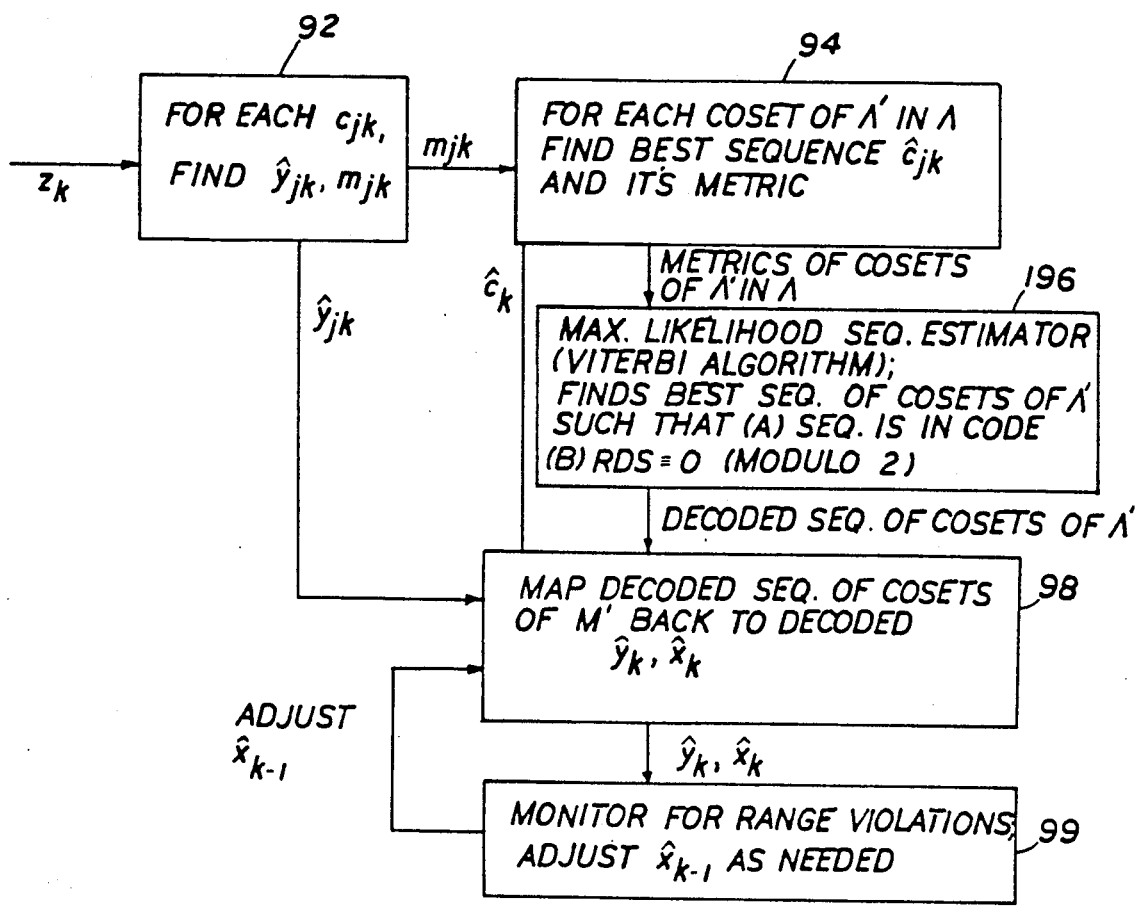
FIG. 27 is a block diagram of an alternative decoder.

The decoder of FIG. 18 can be used, modified only as shown in FIG. 27. For most codes, each of the subsets of the signal constellation (cosets of $\Lambda'$ in $\Lambda$) will contain points all of which have a sum of coordinates which is either even or odd. For example, in FIG. 3, four of the eight subsets contain points whose coordinate sum is 0 (modulo 2), and 4 contain points whose coordinate sum is 1 (modulo 2). Thus the metric of each subset (coset of $\Lambda'$ in $\Lambda$) can be determined as before in blocks 92 and 94; the maximum likelihood sequence estimator 196 is then modified to find the best sequence of cosets that (a) is in the code, and (b) has a running digital sum congruent to zero (modulo 2). The decoded coset sequence is mapped back to $\hat{y}_k$ and $\hat{x}_k$ in block 98 as before, with adjustment of $\hat{x}_{k-1}$ by block 99 if necessary (adjustments will now be by multiples of 2).

There is a drawback to this technique, however, in addition to the doubling of the decoder state space. Two sequences may differ by an odd-weight error sequence followed by a long string of zeros (no differences). The decoder may then follow parallel pairs of states in the decoder trellis for a very long time, without resolving the ambiguity. This 'quasi-catastrophic' behavior can ultimately be resolved by the maximum likelihood sequence estimator only by a range violation due to the differing RDS parity on the two paths. Thus, the decoding delay required to achieve the true $d_{min}^2$ may be very large.

For this reason, it will generally be preferable simply to chose an encoder C with twice the number of states, and use an unaugmented decoder for C. For example, there is a 16-state 2-dimensional Ungerboeck code with $d_{min}^2 = 6$; even though it may have a somewhat larger error coefficient than the 8-state code with an augmented 16-state decoder, we believe that in practice it will be preferable.

It may be worth mentioning that PRC sequences drawn from the 4-state two-dimensional Ungerboeck code also have a true $d_{min}^2$ of 6, since that code has $d_{min}^2 = 4$, with the only weight-4 error sequences being single coordinate errors of magnitude 2, which are also not divisible by $1-D$. A 16-state decoder which keeps track of the RDS modulo 4 can achieve this $d_{min}^2$. However, in this case not only is the code quasi-catastrophic, but also the error coefficient is large, so again it would seem that the ordinary 16-state 2D Ungerboeck code would be preferable.

Quadrature Systems

As mentioned earlier, a complex (or quadrature) partial response system (QPRS) may be modeled as a $1+D$ sampled-data filter operating on a complex-valued RDS sequence $x(D)$ to produce a complex-valued PRC sequence $y(D) = (1+D)x(D)$; i.e., $y_k = x_k + x_{k-1}$. When used with double-sideband quadrature amplitude modulation over a bandpass channel, such a system results in nulls at both band edges, $f_c \pm f_N$, where $f_c$ is the carrier frequency and $f_N = \frac{1}{2}T$ is the width of a single Nyquist band.

When N is even and $4Z^N$ is a sublattice of $\Lambda'$, as is the case with all good codes previously mentioned, then we can adapt a known good code for use in a QPRS system by using essentially the same principles as before. A coset of $4Z^N$ can be specified by N/2 complex-valued coset representatives $c_k$, where coset representatives take on one of 16 possible values, corresponding to 4 integer-spaced values (modulo 4) for the real and imaginary parts of $c_k$, respectively. The general picture of FIG. 8 then holds, except that coset selector 58 and range-identifying parameter selector 64 select N/2 complex-valued coset representatives $c_k$ and range-identifying parameters $a_k$, and the signal point selector operates once per quadrature signal and puts out complex-valued signals $x_k$. Coset precoding as in FIG. 9 is done by forming the complex-valued precoded coset $c'_k 5$ $c_k - c_{k-1}'$ (modulo 4) once per quadrature symbol. RDS feedback as in FIGS. 11, 12, 13 is done by using a function $R(a_k)$ that identifies a region of complex space of area 16 that contains exactly one element from any coset of $4Z^2$, and a complex-valued translation variable $R(x_{k-1})$, ideally equal to $\beta x_{k-1}$. In the cases where $2Z^2$ or $2RZ^2$ is a sublattice of $\Lambda'$, precoding can be done modulo 2 or 2+2i, respectively, and $R(a_k)$ can identify a region of area 4 or 8 containing exactly one element from any coset of $2Z^2$ or $2RZ^2$, respectively.

Higher-Dimensional Systems

We have shown embodiments in which coordinates of N-dimensional symbols are formed on a signal-by-signal (one or two-dimensional) basis, with signal-by-signal feedback of the previous RDS value $x_{k-1}$. Similar kinds of performance can be obtained by systems which select signals on a higher-dimensional basis. In such systems, the precoded coset representatives must be grouped as in FIG. 9 so as to select subsets in the appropriate dimension, signal points then selected in that dimension, and the coordinates then serialized again for transmission over the channel. If the order of cosets is maintained, then such a system retains the property that the PRC sequences are from the given code and have the specified $d_{min}^2$. In such a system it may be more natural to do (RDS) feedback on a higher-dimensional basis rather than on each signal.

N-Dimensional Codes

Although representation of codes in one-dimensional form is desirable, it is not essential. In this section we show how codes may be generated directly in N dimensions. In certain forms, the N-dimensional code is entirely equivalent to its one-dimensional counterpart. In other forms, simplified embodiments may be obtained.

Again, we shall use for illustration the 8-state 2-dimensional Ungerboeck-type code of FIG. 2, with the 2-dimensional 128-point constellation of FIG. 3. In this constellation, recall that each coordinate takes on values from the alphabet of the 12 half-integral values in the range from $-6$ to $6$; the two-dimensional constellation uses 128 of the 144 possible pairwise combinations of elements of this alphabet.

Figure 28:
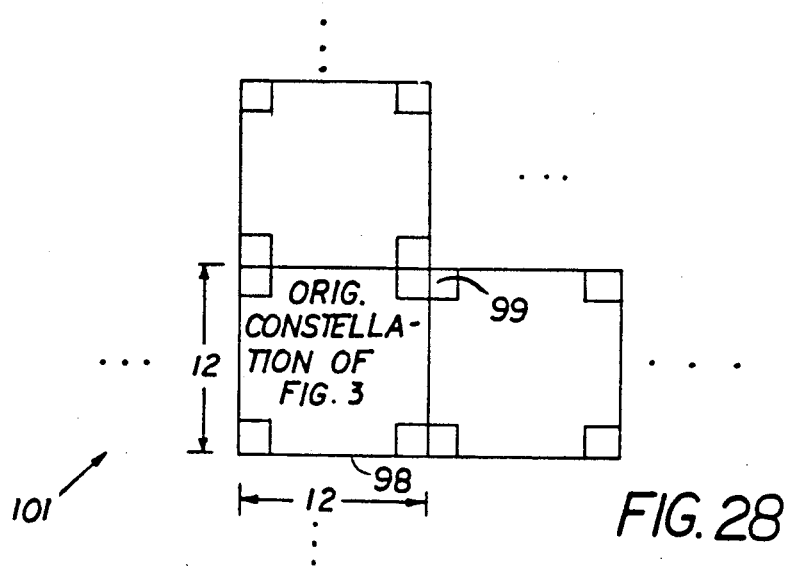
FIG. 28 is a schematic diagram of an expanded signal constellation.

As a first step, we expand the signal constellation to an infinite number of values, as follows. Let the expanded constellation consist of all pairs of numbers that are congruent to some point in the original (FIG. 3) constellation (modulo 12). Thus the points in the expanded constellation consist of pairs of half-integral values. If we regard the original constellation as a cell bounded by a $12 \times 12$ square 98, then the expanded constellation consists of the infinite repetition of this cell throughout 2-space, as indicated diagrammatically in FIG. 28. Note that each cell contains only 128 of the 144 possible points; there are $4 \times 4$ 'holes' 99 in the expanded constellation.

Figure 29:
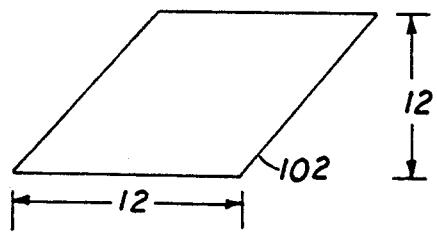
FIG. 29 is a rhombus for use with the constellation of FIG. 28.

The key property of this expanded constellation 101 is that if we place a $12 \times 12$ square anywhere in the plane (with sides oriented horizontally and vertically), the square will enclose exactly 128 points, one congruent to each of the points in the original constellation. An even more general statement is true: if we place a rhombus 102 with horizontal width 12 and vertical height 12 (see FIG. 29) anywhere in the plane, it too will enclose 128 points, one congruent to each point in the original constellation.

Figure 30:
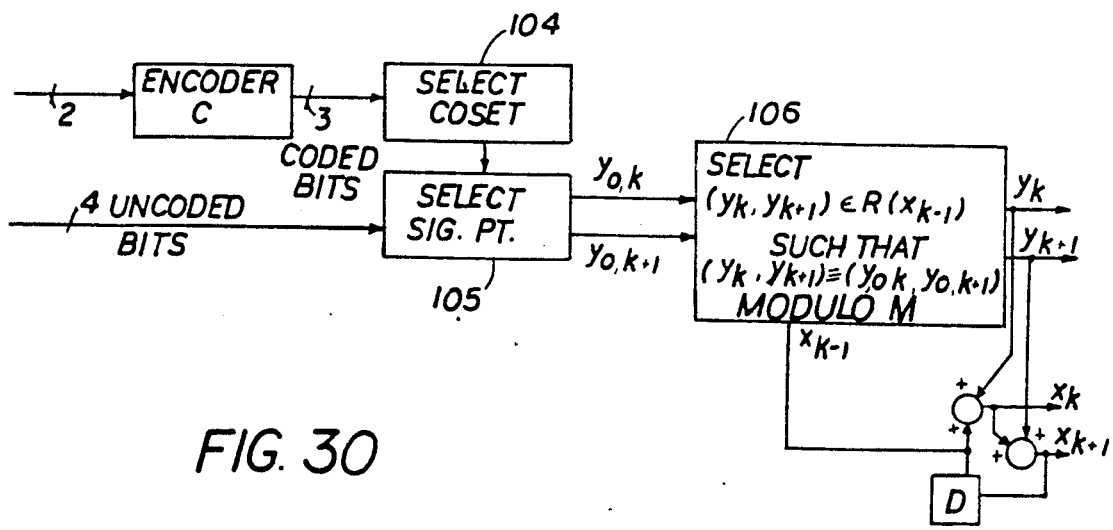
FIG. 30 is a block diagram of a two-dimensional RDS feedback encoder.

Referring to FIG. 30, we may now implement RDS feedback on a two-dimensional basis as follows. Let $x_{k-1}$ represent the running digital sum of all $y_k$ previous to the current (two-dimensional) symbol. Let $R(x_{k-1})$ now denote a region of the plane corresponding to a $12 \times 12$ rhombus a FIG. 29, with both the shape and the location of the rhombus possibly depending on $x_{k-1}$. Let $(y_{0,k}, y_{0,k+1})$ denote the point in the original constellation that would be selected (in selectors 104, 105) by the three coded bits and four uncoded bits according to the unconstrained code (FIG. 2). Then (in selector 106) select $(y_k, y_k)$ as the unique point in the two-dimensional expanded constellation that lies within the region $R(x_{k-1})$ and is congruent to $(y_{0,k}, y_{0,k+1})$ (modulo 12); these will be the two coordinates $y_k$. We can obtain $(x_k, x_{k+1})$ from $x_k = y_k + x_{k-1}$, $x_{k+1} = y_{k+1} + x_k$ as shown.

Figure 31:
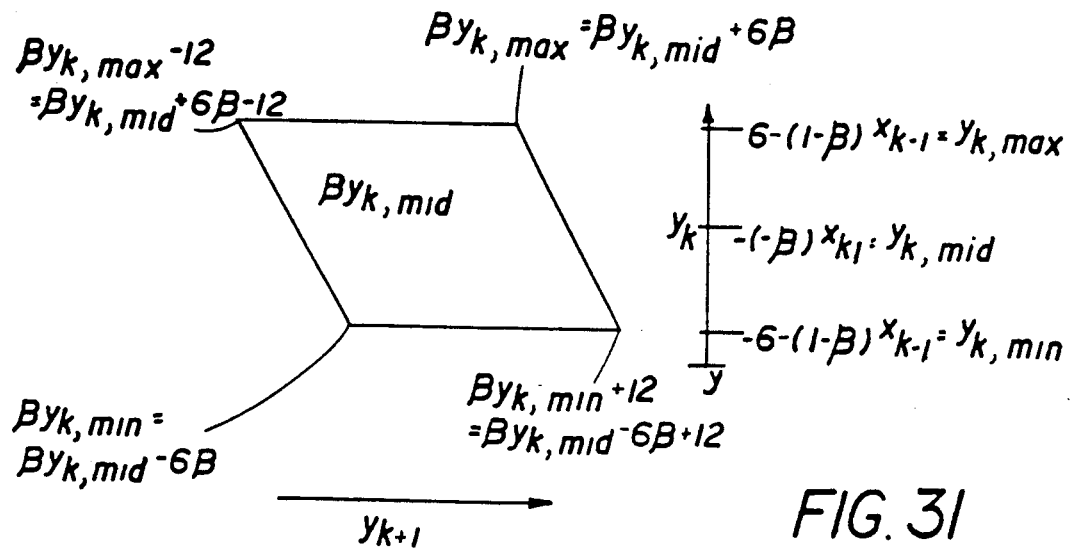
FIG. 31 is a diagram of the dimensions of a rhombus for use with the constellation of FIG. 28.

We now show that this two-dimensional system can produce the same outputs as the one-dimensional RDS feedback system (modulo 12) shown earlier, with the optimal one-dimensional RDS feedback variable $R(x_{k-1}) = \beta x_{k-1}$. Referring to FIG. 31, in one dimension, given $x_{k-1}$, $y_k$ is chosen as the unique value in the range $R_0 + \beta x_{k-1} - x_{k-1}$ congruent to $s_k$ (modulo 12), where we now recognize that $s_k$ is congruent to $y_{0,k}$. Hence, one coordinate of the rhombus used in the two-dimensional system can be taken to lie in the same width-12 range. Then, given $x_{k-1}$ and $y_k$, and thus also $x_k = y_k + x_{k-1}$, $y_{k+1}$ is chosen as the unique value in the range $R_0 - (1-\beta)x_k = R_0 - (1-\beta)y_k - (1-\beta)x_{k-1}$ that is congruent to $s_{k+1} = y_{0,k+1}$ (modulo 12). Thus, $y_{k+1}$ lies in the range $R_0 - (1-\beta)x_{k-1}$ (same as $y_k$), shifted by $-(1-\beta)y_k$.

Thus, by proper choice of rhombus, we can emulate the performance of a one-dimensional (modulo 12) RDS feedback system with a two-dimensional system. It will thus have the same advantages, including avoidance of error propagation and near-optimal tradeoff between $S_x$, $S_y$ and $S_0$, and the same disadvantages, notably the increase in $S_0$ to 12 over the 10.25 otherwise possible.

Figure 32:
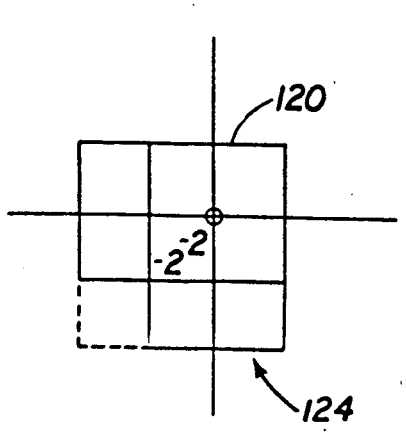
FIG. 32 shows a pair of constellations.
Figure 32:
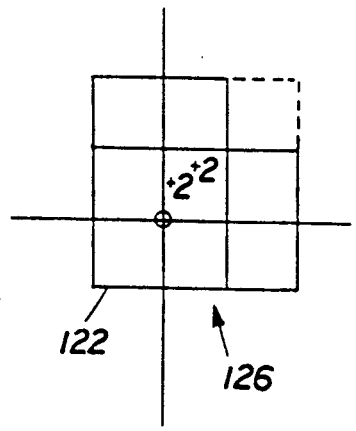

We can choose other two-dimensional RDS feedback variables (regions) to further simplify implementation, and achieve other advantages, at the cost of suboptimal power tradeoffs. For example, a system almost identical to the simplified one-dimensional system described earlier results if we let $R(x_{k-1})$ be the square 120 of side 12 centered at $(-2, -2)$ when $x_{k-1}$ is positive, and the square 122 centered at $(+2, +2)$ when $x_{k-1}$ is negative. Thus we use one of the two constellations 124, 126 shown schematically in FIG. 32.

As in the previous one-dimensional system, inner points are always chosen from the same set regardless of $x_k$, but outer points are varied so as to bias $y_k$ in a positive or negative direction. The ranges of the $y_k$ are strictly limited from $-7\frac{1}{2}$ to $7\frac{1}{2}$. In fact, this system is identical to the earlier simplified system, except that $y_{k+1}$ is chosen on the basis of $x_{k-1}$, rather than $x_k$. In practice, all the measures of performance and spectrum will be very similar.

Figure 33:
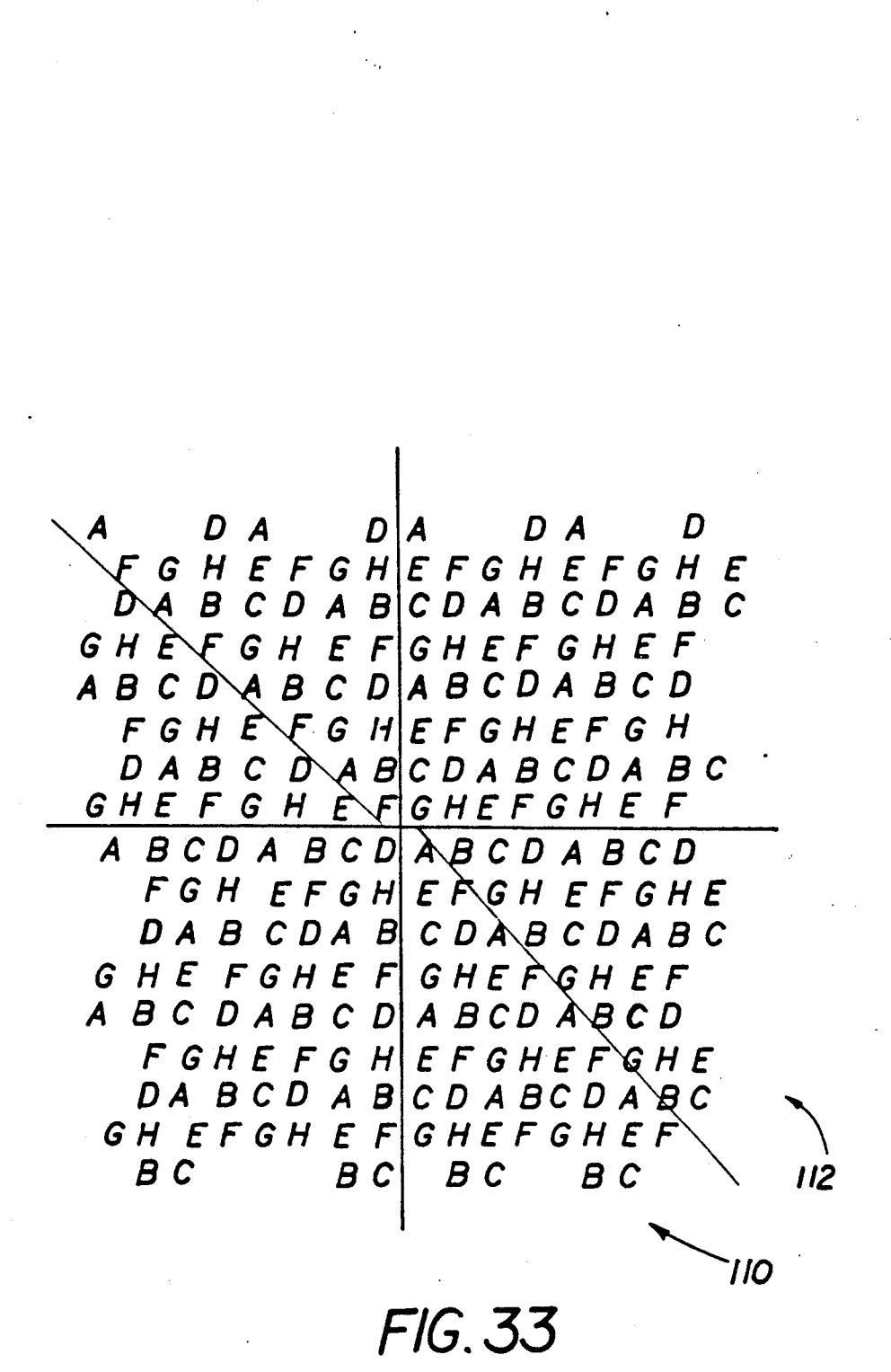

Another variant yields a system akin to that of the Calderbank, Lee, and Mazo type. A CLM-type system uses an expanded signal constellation with twice the ordinary number of signal points, divided into two disjoint constellations, one to be used when $x_{k-1}$ is positive, and the other when $x_{k-1}$ is negative. FIG. 33, for example, shows a 16×16 square constellation divided into two disjoint constellations 110, 112 of 128 points each, such that each such constellation divides evenly into 8 subsets of 16 points each. One constellation consists of points the sum of whose coordinates is positive or zero and is used when $x_{k-1}$ is negative; the other consists of points whose coordinate sums are negative or zero and is used when $x_{k-1}$ is positive. In two dimensions, doubling the constellation size doubles $S_y$ and thus does not yield a favorable power tradeoff; however, in higher dimensions the penalty due to the use of two disjoint constellations is less.

These ideas can be generalized to N dimensions, as follows. If there is a one-dimensional formulation of the code as in FIG. 8, using modulus M, then an N-cube of side M completely surrounds the N-dimensional constellation, and the resulting cell can be replicated to cover N-space without compromising the minimum squared distance between code sequences that are congruent to original code sequences modulo M. Then we may use an N-dimensional RDS feedback function $R(x_{k-1})$, where for all $x_k$, $R(x_{k-1})$ is a region of N-space of volume $M^N$ that contains exactly one point in each equivalence class of N-vectors modulo M, in an N-dimensional analogue of FIG. 30.

Other embodiments are within the following claims.

We claim:

1. Apparatus for generating a sequence of digital signals $x_k$ and/or a sequence of digital signals $y_k$, $k=1, 2, \ldots$, such that the sequence of $y_k$ signals is a partial-response-coded sequence derived from the sequence of $x_k$ signals, said signals $y_k$ being a sequence in a given modulation code, said apparatus comprising a coset selector for generating coset representatives $c_k$ in accordance with said given modulation code; and an encoder for selecting J said signals $y_k$, $J \geq 1$, ($y_k, y_{k+1}, \ldots, y_{k+J-1}$) to be congruent to a sequence of J coset representatives $c_k$ (modulo $\Lambda_N$), $\Lambda_N$ being an N-dimensional lattice, N being a positive integer, each of said J signals being chosen from a corresponding one of a plurality of J-dimensional constellations, said choice being based on a previous $x_{k'}$, $k' < k$, at least one of said plurality of J-dimensional constellations comprising both a point with a positive sum of coordinates and another point with a negative sum of coordinates, said encoder being arranged so that said signals $x_k$ have finite variance $S_x$.

2. The apparatus of claim 1 wherein the relationship between the $x_k$ signals and $y_k$ signals is $y_k = x_k \pm x_{k-L}$, L an integer.

3. The apparatus of claim 2 wherein J is 1.

4. The apparatus of claim 2 wherein J is the same as number N of dimensions in said modulation code.

5. The apparatus of claim 2 wherein $k' = k-1$.

6. The apparatus of claim 2 wherein J is 1 and each said constellation is a one-dimensional range of values centered on $\beta x_{k-1}$, $0 \leq \beta < 1$.

7. The apparatus of claim 6 wherein $\beta > 0$.

8. The apparatus of claim 2 wherein there are a finite set of said J-dimensional constellations.

9. The apparatus of claim 8 wherein there are two said J-dimensional constellations.

10. The apparatus of claim 2 wherein at least two of said J-dimensional constellations are not disjoint.

11. Apparatus for generating a sequence of digital signals $x_k$ and/or a sequence of digital signals $y_k$, $k=1, 2, \ldots$, such that the sequence of $y_k$ signals is a partial-response-coded sequence derived from the sequence of $x_k$ signals, said signals $y_k$ being a sequence in a given modulation code, said apparatus comprising a coset selector for generating coset representatives $c_k$ in accordance with said given modulation code;

a generator of a sequence of alternative coset representatives $c_k'$ chosen so that the sequence of coset representatives $c_k$ is a partial-response-coded sequence derived from the sequence of $c_k'$ signals, and an encoder for selecting said signals $x_k$ to be congruent to a sequence of alternative coset representatives $c_k'$, where the congruence is modulo M if said coset representatives $c_k$ are real, M being an integer, and modulo $\Lambda_N$ if said $c_k$ signals are N-dimensional, $\Lambda_N$ being an N-dimensional lattice, N being an integer.

12. The apparatus of claim 11 wherein the relationship between the $x_k$ signals and $y_k$ signals is $y_k = x_k \pm x_{k-L}$, L an integer and wherein $c_k' = c_k - c'_{k-L}$ (modulo M), in the case when $y_k = x_k + x_{k-L}$, $c_k' = c_k + c'_{k-L}$ (modulo M), in the case where $y_k = x_k - x_{k-L}$.

13. Apparatus for generating a sequence of digital signals $x_k$ and/or a sequence of digital signals $y_k$, $k=1, 2, \ldots$, capable of representing n bits per signal, such that the relationship between $x_k$ and $y_k$ is $y_k = x_k \pm x_{k-L}$, L an integer, said $x_k$ and $y_k$ signals having variances $S_x$ and $S_y$, said $y_k$ signals falling within an alphabet of possible $y_k$ signals that are spaced apart within said alphabet evenly by a spacing $\Delta$, said apparatus comprising means for receiving an input signal having n bits per signal; and an encoder responsive to said receiving means for generating said sequence $y_k$ and said sequence $x_k$ such that said sequence $y_k$ has a variance $S_y$ less than $2S_0$ and said sequence $x_k$ has a variance $S_x$ not much greater than $S_y^2/4(S_y - S_0)$, $S_0$ being approximately equal to the minimum signal power required to represent n bits per signal with a $\Delta$-spaced alphabet.

14. The apparatus of claim 13 wherein said sequence $y_k$ is a sequence in a given modulation code.

15. Apparatus for generating a sequence of digital signals $x_k$ and/or a sequence of digital signals $y_k$, $k=1, 2, \ldots$, such that the sequence of $y_k$ signals is a partial-response-coded sequence derived from the sequence of $x_k$ signals, said $x_k$ and $y_k$ sequences having variances $S_x$ and $S_y$, said symbols $y_k$ being a sequence in a given modulation code, said apparatus comprising means for receiving an input signal; and an encoder responsive to said receiving means for generating said $x_k$ and/or $y_k$ signals such that the ratio of variance $S_y$ to variance $S_x$ is selectable within a predetermined range.

16. The apparatus of claim 15 wherein the relationship between the $x_k$ signals and $y_k$ signals is $y_k = x_x \pm x_{k-L}$, L an integer.

17. The apparatus of claim 16 wherein said $x_k$ and $y_k$ signal sequences are capable of representing n bits per signal, said $y_k$ signals fall within an alphabet of possible $y_k$ signals that are spaced evenly by an amount $\Delta$, said predetermined range is controlled by a parameter $\beta$, and $S_x$ is approximately $S_o/(1-\beta^2)$, and $S_y$ is approximately $2S_o/(1+\beta)$, $S_o$ being approximately the minimum signal power required to represent n bits per symbol with a $\Delta$-spaced alphabet in accordance with said code.

18. Apparatus for generating a sequence in a given N-dimensional modulation code by generating a sequence of one-dimensional signals, N being a positive number, said modulation code being based on an N-dimensional constellation partitioned into subsets associated with said code, said subsets each containing N-dimensional signal points, the choice of said subset being based on coded bits and uncoded bits of said signal points, said apparatus comprising means for receiving an input signal and generating the coded bits and the uncoded bits therefrom; and an encoder for deriving from said coded and uncoded bits, for each said N-dimensional symbol, a set of N, M-valued one-dimensional coset representatives $c_k$ corresponding to congruence classes of each of the N coordinates (modulo M), M being a positive number, each coset representative designating a subset of one-dimensional values in a one-dimensional constellation of possible coordinate values for each of said N dimensions, each said one-dimensional signal in said sequence being selected from said possible coordinate values based on uncoded bits.

19. The apparatus of claim 2, 12, 13, or 16 further comprising an output at which said sequence $y_k$ is delivered.

20. The apparatus of claim 2, 12, 13, or 16 further comprising an output at which said sequence $x_k$ is delivered.

21. The apparatus of claim 2, 12, 13, or 16 wherein L is 1.

22. The apparatus of claim 2, 12, 13, or 16 wherein the relationship between the $x_k$ signals and $y_k$ signals is $y_k = x_k - x_{x-L}$, L an integer.

23. The apparatus of claim 2, 12, 14, 16, or 18 wherein said modulation code is a trellis code.

24. The apparatus of claim 2, 12, 14, 16, or 18 wherein said modulation code is a lattice code.

25. The apparatus of claim 2, 12, or 18 wherein M is 2.

26. The apparatus of claim 2, 12, or 18 wherein M is 4.

27. The apparatus of claim 2, 12, or 18 wherein M is a multiple of 4.

28. The apparatus of claim 2, 12, 13, or 16 wherein $y_k$ and $x_k$ are real valued.

29. The apparatus of claim 2, 12, 13, or 16 wherein $y_k$ and $x_k$ are complex valued.

30. The apparatus of claim 2 or 12 wherein $y_k$ and $x_k$ are complex valued and wherein M is $2+2i$, $i=\sqrt{-1}$.

31. In a decoder for decoding a sequence $z_k = y_k + n_k$, $k=1, 2, \ldots$, into a decoded sequence $y_k$, where the sequence of signals $y_k$ is such that (a) said sequence is from a given modulation code;
(b) the running digital sum $x_k = y_{k-1} + y_{k-2} + \ldots$ has finite variance $S_x$;
(c) said signals $y_k$ fall in a predetermined permissible range dependent on $x_{k'}$, $k' < k$; and the sequence $n_k$ represents noise, a range violation monitor comprising:

a means for reconstructing the estimated running digital sum $\hat{x}_k = \hat{y}_k + \hat{y}_{k-1} + \ldots$, and a means for comparing said decoded sequence $y_k$ with said predetermined permissible range based on said estimated running digital sum $\hat{x}_{k'}$, $k' < k$, and for generating an indication when said $y_k$ is outside said permissible range.

32. A decoder according to claim 31, in which said estimated running digital sum $\hat{x}_k$ is adjusted based on said indication so that $\hat{y}_k$ will be inside said permissible range.

33. A decoder according to claim 32, in which said adjustment is by the minimum possible amount such that $\hat{y}_k$ falls inside said permissible range.

34. A decoder for decoding a sequence $x_k = y_k + n_k$, $k=1, 2, \ldots$, where sequence $n_k$ represents noise and the sequence of signals $y_k$ is such that (a) said sequence is from a given modulation code, said code being capable of being generated by an encoder with a finite number Q of states;
(b) $y_k = x_k \pm x_{k-L}$, L an integer, where said sequence $x_k$ has finite variance $S_x$, and the sequence $n_k$ represents noise, comprising a means for receiving the sequence $z_k$; and a modified maximum likelihood sequence estimator responsive to the receiving means, said estimator being adapted to find MQ partial decoded sequences, up to some time K, where M, Q, and K are positive finite numbers, one such said sequence for each combination of said finite number Q of states and each of a finite number M of integer-spaced values modulo M, such that each said sequence (a) is in said code up to said time K;
(b) corresponds to said encoder being in a given said state at said time K;
(c) corresponds to a value of $x_k$ at said time K that is congruent to a given one of said values, modulo M.

35. A decoder as in claim 34 wherein M is 2.

36. A decoder as in claim 34 wherein M is 4.

* * * * *

UNITED STATES PATENT AND TRADEMARK OFFICE
CERTIFICATE OF CORRECTION

PATENT NO. : 5,040,191
DATED : August 13, 1991
INVENTOR(S) : George D. Forney, Jr. and Vedat M. Eyuboglu It is certified that error appears in the above-indentified patent and that said Letters Patent is hereby corrected as shown below:

On the title page, Item [56]:

Under References - Other Publications, p. 2, col. 2, "A.R. Calberbank et al., "Basebank Trellis Codes..." should be --A.R. Calderbank et al., "Baseband Trellis Codes...--.

On the title page, Item [57]:

In the Abstract, line 2, "$X_k$" should be --$x_k$--; line 3, "$Y_k$" should be --$y_k$--; line 4, "$Y_k=X_k\pm X_{k-1}$" should be --$Y_k=X_k=X_{k-1}$--; line 4, "$Y_x$" should be --$y_k$--; line 6, "$Y_k$" should be --$y_k$--; line 16, "dimentional" should be --dimensional--.

Col. 3, line 63, "$c_k$" should be --$c_k'$--.

Col. 8, line 55, "$A_{16}$" should be --$\Lambda_{16}$--; and "$A_{32}$" should be --$\Lambda_{32}$--.

Col. 8, line 56, "$A_{24}$" should be --$\Lambda_{24}$--.

Col. 10, line 9, delete "a" before "above".

Col. 10, line 43, "$d_{min}$" should be --$d_{min}^2$--.

Col. 10, line 44, "$^2$as" should be --as--.

Col. 11, line 27, "$c_c$" should be --$c_k$--.

Col. 12, line 29, delete "20" before "is".

Col. 12, line 65, "form" should be --from--.

UNITED STATES PATENT AND TRADEMARK OFFICE
CERTIFICATE OF CORRECTION

PATENT NO. : 5,040,191  Page 2 of 6
DATED : August 13, 1991
INVENTOR(S) : George D. Forney, Jr. and Vedat M. Eyuboglu It is certified that error appears in the above-indentified patent and that said Letters Patent is hereby corrected as shown below:

Col. 12, line 67, "orignal" should be --original--.

Col. 13, line 1, after "approaches", insert --1, $S_y$ approaches $S_0$, and $S_y(f)$ approaches--.

Col. 13, lines 2-3, delete "approaches a flat spectrum with a sharp null at DC. Meanwhile,".

Col. 13, line 12, "$_{(modulo\ 4)}$" should be --(modulo 4)--.

Col. 13, line 33, "$R(a_k+R(x_{k-1})$" should be --$R(a_k)+R(x_{k-1})$--.

Col. 13, lines 37-38, delete "is the desired output and the $c'_k$ are always from the same".

Col. 13, line 64, remove boldface type from "D) sampled-data filter and H".

Col. 14, lines 23, "(3/-" should be --(3/2)--.

Col. 14, line 24, eliminate "2)" and replace "51" with --|--.

Col. 14, line 32, "4.92" should be --4.42--.

Col. 14, line 34, start a new paragraph beginning at "(e)".

UNITED STATES PATENT AND TRADEMARK OFFICE
CERTIFICATE OF CORRECTION

PATENT NO. : 5,040,191

DATED : August 13, 1991

INVENTOR(S) : George D. Forney, Jr. and Vedat M. Eyuboglu

It is certified that error appears in the above-indentified patent and that said Letters Patent is hereby corrected as shown below:

Col. 14, line 46, "$S_y(i)$" should be --$S_y(i)$--.

Col. 15, line 33, "$_{or}$" should be --or--.

Col. 15, line 51, after "sequence", insert --$\hat{c}_k$--.

Col. 15, line 57 "Propaqation" should be --Propagation--.

Col. 16, line 21, after "RDS", insert --feedback translation variable, and $x_{k-1}$ is the previous--.

Col. 17, line 26, "$y_k$" should be --$\hat{y}_k$--.

Col. 17, line 26, "$c_k$" should be --$\hat{c}_k$--.

Col. 17, line 26, "$a_k$" should be --$\hat{a}_k$--.

Col. 17, line 28, after "track" delete blank space and continue with sentence.

Col. 17, line 31, after "decoded", insert --$\hat{y}_k$--.

Col. 19, line 9, after "$c'_k$", delete "5" and insert --≡--.

Col. 20, line 14, "a" should be --as in--.

Col. 20, line 20, "$(y_k, y_k)$" should be --$(y_k, y_{k+1})$--.

UNITED STATES PATENT AND TRADEMARK OFFICE
CERTIFICATE OF CORRECTION

PATENT NO. : 5,040,191

DATED : August 13, 1991

INVENTOR(S) : George D. Forney, Jr. and Vedat M. Eyuboglu

It is certified that error appears in the above-indentified patent and that said Letters Patent is hereby corrected as shown below:

Col. 20, line 22, "$(y_{0,k}, y_{0,k-1})$" should be --$(y_{0,k}, y_{0,k+1})$--.

Col. 20, line 24, "$(x_k, x_{k-1})$" should be --$(x_k, x_{k+1})$--.

Col. 20, line 24, "$x_k = y_k + x_{k-1}, x_{k-1} = y_{k-1} + x_k$" should be --$x_k = y_k + x_{k-1}, x_{k+1} = y_{k+1} + x_k$--.

Col. 21, line 28, "$x_k$" should be --$x_{k-1}$--.

Col. 24, line 6, "$y_k$" should be --$\hat{y}_k$--.

Col. 24, lines 12-13, in claim 31(c), "and the sequence $n_k$ represents noise" should start a new line.

Col. 24, line 16, "$x_k = y_k + y_{k-1}$" should be --$\hat{x}_k = \hat{y}_k + \hat{y}_{k-1}$--.

Col. 24, line 17, "$y_k$" should be --$\hat{y}_k$--.

Col. 24, line 19, "$x_k$" should be --$\hat{x}_k$--.

Col. 24, line 20, "$y_k$" should be --$\hat{y}_k$--.

UNITED STATES PATENT AND TRADEMARK OFFICE
CERTIFICATE OF CORRECTION

PATENT NO. : 5,040,191
DATED : August 13, 1991
INVENTOR(S) : George D. Forney, Jr. and Vedat M. Eyuboglu It is certified that error appears in the above-indentified patent and that said Letters Patent is hereby corrected as shown below:

Col. 21, line 47, "each of said J signals" should read --said J signals--.

Col. 21, lines 47-48, "from a corresponding one of" should read --from one of--.

Col. 21, line 48, "J-dimensional" should read --NJ-dimensional--.

Col. 21, line 60, "J" should read --NJ--.

Col. 21, lines 60-61, "as number N" should read --as the number--.

Col. 21, line 68, "said J-dimensional constellations" should read --said NJ-dimensional constellations--.

UNITED STATES PATENT AND TRADEMARK OFFICE
CERTIFICATE OF CORRECTION

PATENT NO. : 5,040,191
DATED : August 13, 1991
INVENTOR(S) : George D. Forney, Jr. and Vedat M. Eyuboglu It is certified that error appears in the above-indentified patent and that said Letters Patent is hereby corrected as shown below:

Col. 22, line 2, "said J-dimensional constellations" should read --said NJ-dimensional constellations--.

Col. 22, line 4, "said J-dimensional constellations" should read --said NJ-dimensional constellations--.

Signed and Sealed this

Seventh Day of December, 1993

BRUCE LEHMAN

*Attest:*

*Attesting Officer*     *Commissioner of Patents and Trademarks*